US006778835B2

(12) United States Patent
You et al.

(10) Patent No.: US 6,778,835 B2
(45) Date of Patent: Aug. 17, 2004

(54) METHOD FOR ALLOCATING PHYSICAL CHANNEL OF MOBILE COMMUNICATION SYSTEM AND COMMUNICATION METHOD USING THE SAME

(75) Inventors: Cheol Woo You, Seoul (KR); Jee Woong Seol, Seoul (KR); Young Hwan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 09/809,267

(22) Filed: Mar. 16, 2001

(65) Prior Publication Data

US 2001/0024956 A1 Sep. 27, 2001

(30) Foreign Application Priority Data

| | | |
|---|---|---|
| Mar. 18, 2000 | (KR) | 2000-13842 |
| Mar. 18, 2000 | (KR) | 2000-13844 |
| Mar. 29, 2000 | (KR) | 2000-16168 |
| Mar. 29, 2000 | (KR) | 2000-16171 |

(51) Int. Cl.[7] .......... H04Q 7/20

(52) U.S. Cl. .......... 455/455; 455/450; 455/504; 370/329; 370/331; 370/341

(58) Field of Search .......... 455/450, 455, 455/464, 343, 509–511, 515, 516, 154.1, 158.1, 185.1; 370/327, 328, 329, 335, 341, 431, 493, 437

(56) References Cited

U.S. PATENT DOCUMENTS

| | | | | | |
|---|---|---|---|---|---|
| 6,108,550 | A | * | 8/2000 | Wiorek et al. | 455/447 |
| 6,275,695 | B1 | * | 8/2001 | Obhan | 455/423 |
| 6,356,759 | B1 | * | 3/2002 | Mustajarvi | 455/450 |
| 6,381,229 | B1 | * | 4/2002 | Narvinger et al. | 370/328 |

(List continued on next page.)

FOREIGN PATENT DOCUMENTS

WO WO 99/60729 11/1999

OTHER PUBLICATIONS

ETSI TS 125 214 V3.2.0; "Universal Mobile Telecommunications System (UMTS); Physical layer procedures (FDD)"; Mar. 2000; pp. 1–49; European Telecommunications Standards Institute 2000; France.

ETSI TS 125 213 V3.2.0; "Universal Mobile Telecommunications System (UMTS); Spreading and modulation (FDD)"; Mar. 2000; pp. 1–47; European Telecommunications Standards Institute 2000; France.

(List continued on next page.)

*Primary Examiner*—Cong Van Tran
(74) *Attorney, Agent, or Firm*—Lee, Hong, Degerman, Kang & Schmadeka

(57) ABSTRACT

The present invention relates to a physical channel allocation method of a mobile communication system and a communication method using the same which is capable of allocating physical channels efficiently for a RACH (Random Access Channel) and a CPCH (Common Packet Channel) having extra up-link scrambling code in a next generation mobile communication system. The communication method of the mobile communication system in accordance with the present invention comprises transmitting a preamble signature code Csig,s generated by using one signature among a plurality of signatures AP#s and a PRACH (Physical Random Access Channel) access preamble code Cpre,n,s generated by using one PRACH preamble scrambling code SC#j among a x-number of PRACH preamble scrambling codes SC#m permitted to the pertinent cell along with an AP (Access Preamble) through a RACH from a terminal to a base station, receiving an AI (Acquisition Indicator) informing a usage of the signature by decoding a signature included in the received AP and the kind of the PRACH scrambling code from the base station by the terminal, and transmitting a message of the terminal to the base station by using a channelizing code determined by the approved signature and PRACH message part scrambling code MSC#m. Accordingly, the terminal and base station can communicate efficiently.

72 Claims, 31 Drawing Sheets

U.S. PATENT DOCUMENTS

| | | | | | |
|---|---|---|---|---|---|
| 6,434,392 | B1 | * | 8/2002 | Posti | 455/452.1 |
| 6,483,826 | B1 | * | 11/2002 | Åkerberg | 370/335 |
| 6,519,240 | B1 | * | 2/2003 | Dillinger et al. | 370/337 |
| 6,535,547 | B1 | * | 3/2003 | Lyckegård et al. | 375/145 |
| 6,567,482 | B1 | * | 5/2003 | Popovic' | 375/343 |
| 6,594,240 | B1 | * | 7/2003 | Chuah et al. | 370/328 |
| 6,606,313 | B1 | * | 8/2003 | Dahlman et al. | 370/347 |
| 6,621,803 | B2 | * | 9/2003 | Halton et al. | 370/329 |
| 6,643,275 | B1 | * | 11/2003 | Gustafsson et al. | 370/328 |

OTHER PUBLICATIONS

ETSI TS 125 211 V3.2.0; "Universal Mobile Telecommunications System (UMTS); Physical channels and mapping of transport channels onto physical channels (FDD)"; Mar. 2000; pp. 13, 15–31, 48 and 49; European Telecommunications Standards Institute 2000; France.

XP–002203811; TSG–RAN Meeting #7 Madrid, Spain, Mar. 13–15, 2000; pp. 1–49; European Telecommunications Standards Institute 2000; France.

XP–002203812; TSG–RAN Meeting #7 Madrid, Spain, Mar. 13–15, 2000; pp. 1–479; European Telecommunications Standards Institute 2000; France.

XP–002203813; TSG–RAN Meeting #7 Madrid, Spain, Mar. 13–15, 2000; pp. 13, 15–31, 48 and 49; European Telecommunications Standards Institute 2000; France.

* cited by examiner

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

FIG. 12

CODE-CHANNEL #0

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

CODE-CHANNEL #1

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

CODE-CHANNEL #3

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

⋮

CODE-CHANNEL #5

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

FIG. 13A

CODE-CHANNEL#0

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

CODE-CHANNEL#1

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 1 | 2 | 3 | 4 | 5 | 6 | 7 | | | | | 0 |
| 1 | 13 | 14 | | | | | | 8 | 9 | 10 | 11 | 12 |
| 2 | | | 0 | 1 | 2 | 3 | 4 | 5 | 6 | 7 | | |
| 3 | 10 | 11 | 12 | 13 | 14 | | | | | | 8 | 9 |
| 4 | 7 | | | | | 0 | 1 | 2 | 3 | 4 | 5 | 6 |
| 5 | | 8 | 9 | 10 | 11 | 12 | 13 | 14 | | | | |
| 6 | 4 | 5 | 6 | 7 | | | | | 0 | 1 | 2 | 3 |
| 7 | | | | | 8 | 9 | 10 | 11 | 12 | 13 | 14 | |

CODE-CHANNEL#2

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 2 | 3 | 4 | 5 | 6 | 7 | | | | | 0 | 1 |
| 1 | 14 | | | | | | 8 | 9 | 10 | 11 | 12 | 13 |
| 2 | | 0 | 1 | 2 | 3 | 4 | 5 | 6 | 7 | | | |
| 3 | 11 | 12 | 13 | 14 | | | | | | 8 | 9 | 10 |
| 4 | | | | | 0 | 1 | 2 | 3 | 4 | 5 | 6 | 7 |
| 5 | 8 | 9 | 10 | 11 | 12 | 13 | 14 | | | | | |
| 6 | 5 | 6 | 7 | | | | | 0 | 1 | 2 | 3 | 4 |
| 7 | | | | 8 | 9 | 10 | 11 | 12 | 13 | 14 | | |

CODE-CHANNEL#3

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 3 | 4 | 5 | 6 | 7 | | | | | 0 | 1 | 2 |
| 1 | | | | | | 8 | 9 | 10 | 11 | 12 | 13 | 14 |
| 2 | 0 | 1 | 2 | 3 | 4 | 5 | 6 | 7 | | | | |
| 3 | 12 | 13 | 14 | | | | | | 8 | 9 | 10 | 11 |
| 4 | | | | 0 | 1 | 2 | 3 | 4 | 5 | 6 | 7 | |
| 5 | 9 | 10 | 11 | 12 | 13 | 14 | | | | | | 8 |
| 6 | 6 | 7 | | | | | 0 | 1 | 2 | 3 | 4 | 5 |
| 7 | | | 8 | 9 | 10 | 11 | 12 | 13 | 14 | | | |

FIG. 13B

CODE-CHANNEL#4

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 4 | 5 | 6 | 7 | | | | | 0 | 1 | 2 | 3 |
| 1 | | | | | 8 | 9 | 10 | 11 | 12 | 13 | 14 | |
| 2 | 1 | 2 | 3 | 4 | 5 | 6 | 7 | | | | | 0 |
| 3 | 13 | 14 | | | | | | 8 | 9 | 10 | 11 | 12 |
| 4 | | | 0 | 1 | 2 | 3 | 4 | 5 | 6 | 7 | | |
| 5 | 10 | 11 | 12 | 13 | 14 | | | | | | 8 | 9 |
| 6 | 7 | | | | | 0 | 1 | 2 | 3 | 4 | 5 | 6 |
| 7 | | 8 | 9 | 10 | 11 | 12 | 13 | 14 | | | | |

CODE-CHANNEL#5

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 5 | 6 | 7 | | | | | 0 | 1 | 2 | 3 | 4 |
| 1 | | | | 8 | 9 | 10 | 11 | 12 | 13 | 14 | | |
| 2 | 2 | 3 | 4 | 5 | 6 | 7 | | | | | 0 | 1 |
| 3 | 14 | | | | | | 8 | 9 | 10 | 11 | 12 | 13 |
| 4 | | 0 | 1 | 2 | 3 | 4 | 5 | 6 | 7 | | | |
| 5 | 11 | 12 | 13 | 14 | | | | | | 8 | 9 | 10 |
| 6 | | | | | 0 | 1 | 2 | 3 | 4 | 5 | 6 | 7 |
| 7 | 8 | 9 | 10 | 11 | 12 | 13 | 14 | | | | | |

CODE-CHANNEL#6

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 6 | 7 | | | | | 0 | 1 | 2 | 3 | 4 | 5 |
| 1 | | | 8 | 9 | 10 | 11 | 12 | 13 | 14 | | | |
| 2 | 3 | 4 | 5 | 6 | 7 | | | | | 0 | 1 | 2 |
| 3 | | | | | | 8 | 9 | 10 | 11 | 12 | 13 | 14 |
| 4 | 0 | 1 | 2 | 3 | 4 | 5 | 6 | 7 | | | | |
| 5 | 12 | 13 | 14 | | | | | | 8 | 9 | 10 | 11 |
| 6 | | | | 0 | 1 | 2 | 3 | 4 | 5 | 6 | 7 | |
| 7 | 9 | 10 | 11 | 12 | 13 | 14 | | | | | | 8 |

CODE-CHANNEL#7

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 7 | | | | | 0 | 1 | 2 | 3 | 4 | 5 | 6 |
| 1 | | 8 | 9 | 10 | 11 | 12 | 13 | 14 | | | | |
| 2 | 4 | 5 | 6 | 7 | | | | | 0 | 1 | 2 | 3 |
| 3 | | | | | 8 | 9 | 10 | 11 | 12 | 13 | 14 | |
| 4 | 1 | 2 | 3 | 4 | 5 | 6 | 7 | | | | | 0 |
| 5 | 13 | 14 | | | | | | 8 | 9 | 10 | 11 | 12 |
| 6 | | | 0 | 1 | 2 | 3 | 4 | 5 | 6 | 7 | | |
| 7 | 10 | 11 | 12 | 13 | 14 | | | | | | 8 | 9 |

FIG. 13C

CODE-CHANNEL #8

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | | | 0 | 1 | 2 | 3 | 4 | 5 | 6 | 7 |
| 1 | 8 | 9 | 10 | 11 | 12 | 13 | 14 | | | | | |
| 2 | 5 | 6 | 7 | | | | | 0 | 1 | 2 | 3 | 4 |
| 3 | | | | 8 | 9 | 10 | 11 | 12 | 13 | 14 | | |
| 4 | 2 | 3 | 4 | 5 | 6 | 7 | | | | | 0 | 1 |
| 5 | 14 | | | | | | 8 | 9 | 10 | 11 | 12 | 13 |
| 6 | | 0 | 1 | 2 | 3 | 4 | 5 | 6 | 7 | | | |
| 7 | 11 | 12 | 13 | 14 | | | | | | 8 | 9 | 10 |

CODE-CHANNEL #9

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | | 0 | 1 | 2 | 3 | 4 | 5 | 6 | 7 | |
| 1 | 9 | 10 | 11 | 12 | 13 | 14 | | | | | | 8 |
| 2 | 6 | 7 | | | | | 0 | 1 | 2 | 3 | 4 | 5 |
| 3 | | | 8 | 9 | 10 | 11 | 12 | 13 | 14 | | | |
| 4 | 3 | 4 | 5 | 6 | 7 | | | | | 0 | 1 | 2 |
| 5 | | | | | | 8 | 9 | 10 | 11 | 12 | 13 | 14 |
| 6 | 0 | 1 | 2 | 3 | 4 | 5 | 6 | 7 | | | | |
| 7 | 12 | 13 | 14 | | | | | | 8 | 9 | 10 | 11 |

CODE-CHANNEL #10

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | 0 | 1 | 2 | 3 | 4 | 5 | 6 | 7 | | |
| 1 | 10 | 11 | 12 | 13 | 14 | | | | | | 8 | 9 |
| 2 | 7 | | | | | 0 | 1 | 2 | 3 | 4 | 5 | 6 |
| 3 | | 8 | 9 | 10 | 11 | 12 | 13 | 14 | | | | |
| 4 | 4 | 5 | 6 | 7 | | | | | 0 | 1 | 2 | 3 |
| 5 | | | | | 8 | 9 | 10 | 11 | 12 | 13 | 14 | |
| 6 | 1 | 2 | 3 | 4 | 5 | 6 | 7 | | | | | |
| 7 | 13 | 14 | | | | | | 8 | 9 | 10 | 11 | 12 |

CODE-CHANNEL #11

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | 0 | 1 | 2 | 3 | 4 | 5 | 6 | 7 | | | |
| 1 | 11 | 12 | 13 | 14 | | | | | | 8 | 9 | 10 |
| 2 | | | | | 0 | 1 | 2 | 3 | 4 | 5 | 6 | 7 |
| 3 | 8 | 9 | 10 | 11 | 12 | 13 | 14 | | | | | |
| 4 | 5 | 6 | 7 | | | | | 0 | 1 | 2 | 3 | 4 |
| 5 | | | | 8 | 9 | 10 | 11 | 12 | 13 | 14 | | |
| 6 | 2 | 3 | 4 | 5 | 6 | 7 | | | | | 0 | 1 |
| 7 | 14 | | | | | | 8 | 9 | 10 | 11 | 12 | 13 |

FIG. 13D

CODE-CHANNEL#12

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | | | | 7 | 6 | 5 | 4 | 3 | 2 | 1 | 0 |
| 1 | 11 | 10 | 9 | 8 | | | | | | 14 | 13 | 12 |
| 2 | | 7 | 6 | 5 | 4 | 3 | 2 | 1 | 0 | | | |
| 3 | 8 | | | | | | 14 | 13 | 12 | 11 | 10 | 9 |
| 4 | 5 | 4 | 3 | 2 | 1 | 0 | | | | | 7 | 6 |
| 5 | | | | 14 | 13 | 12 | 11 | 10 | 9 | 8 | | |
| 6 | 2 | 1 | 0 | | | | | 7 | 6 | 5 | 4 | 3 |
| 7 | 14 | 13 | 12 | 11 | 10 | 9 | 8 | | | | | |

CODE-CHANNEL#13

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | | | 7 | 6 | 5 | 4 | 3 | 2 | 1 | 0 | |
| 1 | 10 | 9 | 8 | | | | | | 14 | 13 | 12 | 11 |
| 2 | 7 | 6 | 5 | 4 | 3 | 2 | 1 | 0 | | | | |
| 3 | | | | | | 14 | 13 | 12 | 11 | 10 | 9 | 8 |
| 4 | 4 | 3 | 2 | 1 | 0 | | | | | 7 | 6 | 5 |
| 5 | | | 14 | 13 | 12 | 11 | 10 | 9 | 8 | | | |
| 6 | 1 | 0 | | | | | 7 | 6 | 5 | 4 | 3 | 2 |
| 7 | 13 | 12 | 11 | 10 | 9 | 8 | | | | | | 14 |

CODE-CHANNEL#14

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | | 7 | 6 | 5 | 4 | 3 | 2 | 1 | 0 | | |
| 1 | 9 | 8 | | | | | | 14 | 13 | 12 | 11 | 10 |
| 2 | 6 | 5 | 4 | 3 | 2 | 1 | 0 | | | | | 7 |
| 3 | | | | | 14 | 13 | 12 | 11 | 10 | 9 | 8 | |
| 4 | 3 | 2 | 1 | 0 | | | | | 7 | 6 | 5 | 4 |
| 5 | | 14 | 13 | 12 | 11 | 10 | 9 | 8 | | | | |
| 6 | 0 | | | | | 7 | 6 | 5 | 4 | 3 | 2 | 1 |
| 7 | 12 | 11 | 10 | 9 | 8 | | | | | | 14 | 13 |

CODE-CHANNEL#15

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | 7 | 6 | 5 | 4 | 3 | 2 | 1 | 0 | | | |
| 1 | 8 | | | | | | 14 | 13 | 12 | 11 | 10 | 9 |
| 2 | 5 | 4 | 3 | 2 | 1 | 0 | | | | | 7 | 6 |
| 3 | | | | 14 | 13 | 12 | 11 | 10 | 9 | 8 | | |
| 4 | 2 | 1 | 0 | | | | | 7 | 6 | 5 | 4 | 3 |
| 5 | 14 | 13 | 12 | 11 | 10 | 9 | 8 | | | | | |
| 6 | | | | | 7 | 6 | 5 | 4 | 3 | 2 | 1 | 0 |
| 7 | 11 | 10 | 9 | 8 | | | | | | 14 | 13 | 12 |

FIG. 14A

CODE-CHANNEL#0

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

CODE-CHANNEL#1

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 1 | 2 | 3 | 4 | 5 | 6 | 7 | | | | | 0 |
| 1 | 13 | 14 | | | | | | 8 | 9 | 10 | 11 | 12 |
| 2 | | | 0 | 1 | 2 | 3 | 4 | 5 | 6 | 7 | | |
| 3 | 10 | 11 | 12 | 13 | 14 | | | | | | 8 | 9 |
| 4 | 7 | | | | | 0 | 1 | 2 | 3 | 4 | 5 | 6 |
| 5 | | 8 | 9 | 10 | 11 | 12 | 13 | 14 | | | | |
| 6 | 4 | 5 | 6 | 7 | | | | | 0 | 1 | 2 | 3 |
| 7 | | | | | 8 | 9 | 10 | 11 | 12 | 13 | 14 | |

CODE-CHANNEL#2

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 2 | 3 | 4 | 5 | 6 | 7 | | | | | 0 | 1 |
| 1 | 14 | | | | | | 8 | 9 | 10 | 11 | 12 | 13 |
| 2 | | 0 | 1 | 2 | 3 | 4 | 5 | 6 | 7 | | | |
| 3 | 11 | 12 | 13 | 14 | | | | | | 8 | 9 | 10 |
| 4 | | | | | 0 | 1 | 2 | 3 | 4 | 5 | 6 | 7 |
| 5 | 8 | 9 | 10 | 11 | 12 | 13 | 14 | | | | | |
| 6 | 5 | 6 | 7 | | | | | 0 | 1 | 2 | 3 | 4 |
| 7 | | | | 8 | 9 | 10 | 11 | 12 | 13 | 14 | | |

CODE-CHANNEL#3

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 3 | 4 | 5 | 6 | 7 | | | | | 0 | 1 | 2 |
| 1 | | | | | | 8 | 9 | 10 | 11 | 12 | 13 | 14 |
| 2 | 0 | 1 | 2 | 3 | 4 | 5 | 6 | 7 | | | | |
| 3 | 12 | 13 | 14 | | | | | | 8 | 9 | 10 | 11 |
| 4 | | | | 0 | 1 | 2 | 3 | 4 | 5 | 6 | 7 | |
| 5 | 9 | 10 | 11 | 12 | 13 | 14 | | | | | | 8 |
| 6 | 6 | 7 | | | | | 0 | 1 | 2 | 3 | 4 | 5 |
| 7 | | | 8 | 9 | 10 | 11 | 12 | 13 | 14 | | | |

FIG. 14B

CODE-CHANNEL#4

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 4 | 5 | 6 | 7 | | | | | 0 | 1 | 2 | 3 |
| 1 | | | | | 8 | 9 | 10 | 11 | 12 | 13 | 14 | |
| 2 | 1 | 2 | 3 | 4 | 5 | 6 | 7 | | | | | 0 |
| 3 | 13 | 14 | | | | | | 8 | 9 | 10 | 11 | 12 |
| 4 | | | 0 | 1 | 2 | 3 | 4 | 5 | 6 | 7 | | |
| 5 | 10 | 11 | 12 | 13 | 14 | | | | | | 8 | 9 |
| 6 | 7 | | | | | 0 | 1 | 2 | 3 | 4 | 5 | 6 |
| 7 | | 8 | 9 | 10 | 11 | 12 | 13 | 14 | | | | |

CODE-CHANNEL#5

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 5 | 6 | 7 | | | | | 0 | 1 | 2 | 3 | 4 |
| 1 | | | | 8 | 9 | 10 | 11 | 12 | 13 | 14 | | |
| 2 | 2 | 3 | 4 | 5 | 6 | 7 | | | | | 0 | 1 |
| 3 | 14 | | | | | | 8 | 9 | 10 | 11 | 12 | 13 |
| 4 | | 0 | 1 | 2 | 3 | 4 | 5 | 6 | 7 | | | |
| 5 | 11 | 12 | 13 | 14 | | | | | | 8 | 9 | 10 |
| 6 | | | | | 0 | 1 | 2 | 3 | 4 | 5 | 6 | 7 |
| 7 | 8 | 9 | 10 | 11 | 12 | 13 | 14 | | | | | |

CODE-CHANNEL#6

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 6 | 7 | | | | | 0 | 1 | 2 | 3 | 4 | 5 |
| 1 | | | 8 | 9 | 10 | 11 | 12 | 13 | 14 | | | |
| 2 | 3 | 4 | 5 | 6 | 7 | | | | | 0 | 1 | 2 |
| 3 | | | | | | 8 | 9 | 10 | 11 | 12 | 13 | 14 |
| 4 | 0 | 1 | 2 | 3 | 4 | 5 | 6 | 7 | | | | |
| 5 | 12 | 13 | 14 | | | | | | 8 | 9 | 10 | 11 |
| 6 | | | | 0 | 1 | 2 | 3 | 4 | 5 | 6 | 7 | |
| 7 | 9 | 10 | 11 | 12 | 13 | 14 | | | | | | 8 |

CODE-CHANNEL#7

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | 7 | | | | | 0 | 1 | 2 | 3 | 4 | 5 | 6 |
| 1 | | 8 | 9 | 10 | 11 | 12 | 13 | 14 | | | | |
| 2 | 4 | 5 | 6 | 7 | | | | | 0 | 1 | 2 | 3 |
| 3 | | | | | 8 | 9 | 10 | 11 | 12 | 13 | 14 | |
| 4 | 1 | 2 | 3 | 4 | 5 | 6 | 7 | | | | | 0 |
| 5 | 13 | 14 | | | | | | 8 | 9 | 10 | 11 | 12 |
| 6 | | | 0 | 1 | 2 | 3 | 4 | 5 | 6 | 7 | | |
| 7 | 10 | 11 | 12 | 13 | 14 | | | | | | 8 | 9 |

FIG. 14C

CODE-CHANNEL #8

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | | | 0 | 1 | 2 | 3 | 4 | 5 | 6 | 7 |
| 1 | 8 | 9 | 10 | 11 | 12 | 13 | 14 | | | | | |
| 2 | 5 | 6 | 7 | | | | | 0 | 1 | 2 | 3 | 4 |
| 3 | | | | 8 | 9 | 10 | 11 | 12 | 13 | 14 | | |
| 4 | 2 | 3 | 4 | 5 | 6 | 7 | | | | | 0 | 1 |
| 5 | 14 | | | | | | 8 | 9 | 10 | 11 | 12 | 13 |
| 6 | | 0 | 1 | 2 | 3 | 4 | 5 | 6 | 7 | | | |
| 7 | 11 | 12 | 13 | 14 | | | | | | 8 | 9 | 10 |

CODE-CHANNEL #9

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | | 0 | 1 | 2 | 3 | 4 | 5 | 6 | 7 | |
| 1 | 9 | 10 | 11 | 12 | 13 | 14 | | | | | | 8 |
| 2 | 6 | 7 | | | | | 0 | 1 | 2 | 3 | 4 | 5 |
| 3 | | | 8 | 9 | 10 | 11 | 12 | 13 | 14 | | | |
| 4 | 3 | 4 | 5 | 6 | 7 | | | | | 0 | 1 | 2 |
| 5 | | | | | | 8 | 9 | 10 | 11 | 12 | 13 | 14 |
| 6 | 0 | 1 | 2 | 3 | 4 | 5 | 6 | 7 | | | | |
| 7 | 12 | 13 | 14 | | | | | | 8 | 9 | 10 | 11 |

CODE-CHANNEL #10

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | | 0 | 1 | 2 | 3 | 4 | 5 | 6 | 7 | | |
| 1 | 10 | 11 | 12 | 13 | 14 | | | | | | 8 | 9 |
| 2 | 7 | | | | | 0 | 1 | 2 | 3 | 4 | 5 | 6 |
| 3 | | 8 | 9 | 10 | 11 | 12 | 13 | 14 | | | | |
| 4 | 4 | 5 | 6 | 7 | | | | | 0 | 1 | 2 | 3 |
| 5 | | | | | 8 | 9 | 10 | 11 | 12 | 13 | 14 | |
| 6 | 1 | 2 | 3 | 4 | 5 | 6 | 7 | | | | | |
| 7 | 13 | 14 | | | | | | 8 | 9 | 10 | 11 | 12 |

CODE-CHANNEL #11

| | SUB-CHANNEL NUMBER | | | | | | | | | | | |
|---|---|---|---|---|---|---|---|---|---|---|---|---|
| SFN MODULO 8 | 0 | 1 | 2 | 3 | 4 | 5 | 6 | 7 | 8 | 9 | 10 | 11 |
| 0 | | 0 | 1 | 2 | 3 | 4 | 5 | 6 | 7 | | | |
| 1 | 11 | 12 | 13 | 14 | | | | | | 8 | 9 | 10 |
| 2 | | | | | 0 | 1 | 2 | 3 | 4 | 5 | 6 | 7 |
| 3 | 8 | 9 | 10 | 11 | 12 | 13 | 14 | | | | | |
| 4 | 5 | 6 | 7 | | | | | 0 | 1 | 2 | 3 | 4 |
| 5 | | | | 8 | 9 | 10 | 11 | 12 | 13 | 14 | | |
| 6 | 2 | 3 | 4 | 5 | 6 | 7 | | | | | 0 | 1 |
| 7 | 14 | | | | | | 8 | 9 | 10 | 11 | 12 | 13 |

FIG. 14D

CODE-CHANNEL#12

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | | | | 7 | 6 | 5 | 4 | 3 | 2 | 1 | 0 |
| 1 | 11 | 10 | 9 | 8 | | | | | | 14 | 13 | 12 |
| 2 | | 7 | 6 | 5 | 4 | 3 | 2 | 1 | 0 | | | |
| 3 | 8 | | | | | | 14 | 13 | 12 | 11 | 10 | 9 |
| 4 | 5 | 4 | 3 | 2 | 1 | 0 | | | | | 7 | 6 |
| 5 | | | | 14 | 13 | 12 | 11 | 10 | 9 | 8 | | |
| 6 | 2 | 1 | 0 | | | | | 7 | 6 | 5 | 4 | 3 |
| 7 | 14 | 13 | 12 | 11 | 10 | 9 | 8 | | | | | |

CODE-CHANNEL#13

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 0 | 1 | 2 | | | | | 3 | 4 | 5 | 6 | 7 |
| 1 | 12 | 13 | 14 | 8 | 9 | 10 | 11 | | | | | |
| 2 | | | | 5 | 6 | 7 | | 0 | 1 | 2 | 3 | 4 |
| 3 | 9 | 10 | 11 | | | | 8 | 12 | 13 | 14 | | |
| 4 | 6 | 7 | | 2 | 3 | 4 | 5 | | | | 0 | 1 |
| 5 | | | 8 | 14 | | | | 9 | 10 | 11 | 12 | 13 |
| 6 | 3 | 4 | 5 | | 0 | 1 | 2 | 6 | 7 | | | |
| 7 | | | | 11 | 12 | 13 | 14 | | | 8 | 9 | 10 |

CODE-CHANNEL#14

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | | | | | 3 | 4 | 5 | 6 | 7 | 0 | 1 | 2 |
| 1 | 8 | 9 | 10 | 11 | | | | | | 12 | 13 | 14 |
| 2 | 5 | 6 | 7 | | 0 | 1 | 2 | 3 | 4 | | | |
| 3 | | | | 8 | 12 | 13 | 14 | | | 9 | 10 | 11 |
| 4 | 2 | 3 | 4 | 5 | | | | 0 | 1 | 6 | 7 | |
| 5 | 14 | | | | 9 | 10 | 11 | 12 | 13 | | | 8 |
| 6 | | 0 | 1 | 2 | 6 | 7 | | | | 3 | 4 | 5 |
| 7 | 11 | 12 | 13 | 14 | | | 8 | 9 | 10 | | | |

CODE-CHANNEL#15

| | SUB-CHANNEL NUMBER | | | | | | | | | | | |
|---|---|---|---|---|---|---|---|---|---|---|---|---|
| SFN MODULE 8 | 0 | 1 | 2 | 3 | 4 | 5 | 6 | 7 | 8 | 9 | 10 | 11 |
| 0 | 3 | 4 | 5 | 6 | 7 | 0 | 1 | 2 | | | | |
| 1 | | | | | | 12 | 13 | 14 | 8 | 9 | 10 | 11 |
| 2 | 0 | 1 | 2 | 3 | 4 | | | | 5 | 6 | 7 | |
| 3 | 12 | 13 | 14 | | | 9 | 10 | 11 | | | | 8 |
| 4 | | | | 0 | 1 | 6 | 7 | | 2 | 3 | 4 | 5 |
| 5 | 9 | 10 | 11 | 12 | 13 | | | 8 | 14 | | | |
| 6 | 6 | 7 | | | | 3 | 4 | 5 | | 0 | 1 | 2 |
| 7 | | | 8 | 9 | 10 | | | | 11 | 12 | 13 | 14 |

| S | $b_{s0}, b_{s1}, \ldots b_{s31}$ |
|---|---|
| 0 | 1 1 1 1 1 1 1 1 1 1 1 1 1 1 1 1 1 1 1 1 1 1 1 1 1 1 1 1 1 1 1 1 |
| 1 | 1 1 −1 −1 1 1 −1 −1 1 1 −1 −1 1 1 −1 −1 1 1 −1 −1 1 1 −1 −1 1 1 −1 −1 1 1 −1 −1 |
| 2 | 1 1 1 1 −1 −1 −1 −1 1 1 1 1 −1 −1 −1 −1 1 1 1 1 −1 −1 −1 −1 1 1 1 1 −1 −1 −1 −1 |
| 3 | 1 1 −1 −1 −1 −1 1 1 1 1 −1 −1 −1 −1 1 1 1 1 −1 −1 −1 −1 1 1 1 1 −1 −1 −1 −1 1 1 |
| 4 | 1 1 1 1 1 1 1 1 −1 −1 −1 −1 −1 −1 −1 −1 1 1 1 1 1 1 1 1 −1 −1 −1 −1 −1 −1 −1 −1 |
| 5 | 1 1 −1 −1 1 1 −1 −1 −1 −1 1 1 −1 −1 1 1 1 1 −1 −1 1 1 −1 −1 −1 −1 1 1 −1 −1 1 1 |
| 6 | 1 1 1 1 −1 −1 −1 −1 −1 −1 −1 −1 1 1 1 1 1 1 1 1 −1 −1 −1 −1 −1 −1 −1 −1 1 1 1 1 |
| 7 | 1 1 −1 −1 −1 −1 1 1 −1 −1 1 1 1 1 −1 −1 1 1 −1 −1 −1 −1 1 1 −1 −1 1 1 1 1 −1 −1 |
| 8 | 1 1 1 1 1 1 1 1 1 1 1 1 1 1 1 1 −1 −1 −1 −1 −1 −1 −1 −1 −1 −1 −1 −1 −1 −1 −1 −1 |
| 9 | 1 1 −1 −1 1 1 −1 −1 1 1 −1 −1 1 1 −1 −1 1 1 −1 −1 1 1 −1 −1 1 1 −1 −1 1 1 −1 −1 |
| 10 | 1 1 1 1 −1 −1 −1 −1 1 1 1 1 −1 −1 −1 −1 1 1 1 1 −1 −1 −1 −1 1 1 1 1 −1 −1 −1 −1 |
| 11 | 1 1 −1 −1 −1 −1 1 1 1 1 −1 −1 −1 −1 1 1 −1 −1 1 1 1 1 −1 −1 −1 −1 1 1 1 1 −1 −1 |
| 12 | 1 1 1 1 1 1 1 1 −1 −1 −1 −1 −1 −1 −1 −1 −1 −1 −1 −1 −1 −1 −1 −1 1 1 1 1 1 1 1 1 |
| 13 | 1 1 −1 −1 1 1 −1 −1 −1 −1 1 1 −1 −1 1 1 −1 −1 1 1 −1 −1 1 1 1 1 −1 −1 1 1 −1 −1 |
| 14 | 1 1 1 1 −1 −1 −1 −1 −1 −1 −1 −1 1 1 1 1 −1 −1 −1 −1 1 1 1 1 1 1 1 1 −1 −1 −1 −1 |
| 15 | 1 1 −1 −1 −1 −1 1 1 −1 −1 1 1 1 1 −1 −1 −1 −1 1 1 1 1 −1 −1 1 1 −1 −1 −1 −1 1 1 |

FIG. 23

| m | $RI_{signature}$ #m={$C_0$, $C_1$, ⋯ , $C_6$, $C_7$} | | | | | | | |
|---|---|---|---|---|---|---|---|---|
| 0 | 1 | 1 | 1 | 1 | 1 | 1 | 1 | 1 |
| 1 | 1 | −1 | 1 | −1 | 1 | −1 | 1 | −1 |
| 2 | 1 | 1 | −1 | −1 | 1 | 1 | −1 | −1 |
| 3 | 1 | 1 | −1 | −1 | 1 | 1 | −1 | −1 |
| 4 | 1 | 1 | 1 | 1 | −1 | −1 | −1 | −1 |
| 5 | 1 | −1 | 1 | −1 | −1 | 1 | −1 | 1 |
| 6 | 1 | 1 | −1 | −1 | −1 | −1 | 1 | 1 |
| 7 | 1 | −1 | −1 | 1 | −1 | 1 | 1 | −1 |
| 8 | −1 | −1 | −1 | −1 | −1 | −1 | −1 | −1 |
| 9 | −1 | 1 | −1 | 1 | −1 | 1 | −1 | 1 |
| 10 | −1 | −1 | 1 | 1 | −1 | −1 | 1 | 1 |
| 11 | −1 | −1 | 1 | 1 | −1 | −1 | 1 | 1 |
| 12 | −1 | −1 | −1 | −1 | 1 | 1 | 1 | 1 |
| 13 | −1 | 1 | −1 | 1 | 1 | −1 | 1 | −1 |
| 14 | −1 | −1 | 1 | 1 | 1 | 1 | −1 | −1 |
| 15 | −1 | 1 | 1 | −1 | 1 | −1 | −1 | 1 |

FIG. 24

| m | $RI_{signature}$ #m={$C_0$, $C_1$, ⋯ , $C_6$, $C_7$} | | | | | | | |
|---|---|---|---|---|---|---|---|---|
| 0 | −1 | −1 | −1 | −1 | −1 | −1 | −1 | −1 |
| 1 | −1 | −1 | −1 | −1 | −1 | −1 | 1 | 1 |
| 2 | −1 | −1 | −1 | −1 | 1 | 1 | −1 | −1 |
| 3 | −1 | −1 | −1 | −1 | 1 | 1 | 1 | 1 |
| 4 | −1 | −1 | 1 | 1 | −1 | −1 | −1 | −1 |
| 5 | −1 | −1 | 1 | 1 | −1 | −1 | 1 | 1 |
| 6 | −1 | −1 | 1 | 1 | 1 | 1 | −1 | −1 |
| 7 | −1 | −1 | 1 | 1 | 1 | 1 | 1 | 1 |
| 8 | 1 | 1 | −1 | −1 | −1 | −1 | −1 | −1 |
| 9 | 1 | 1 | −1 | −1 | −1 | −1 | 1 | 1 |
| 10 | 1 | 1 | −1 | −1 | 1 | 1 | −1 | −1 |
| 11 | 1 | 1 | −1 | −1 | 1 | 1 | 1 | 1 |
| 12 | 1 | 1 | 1 | 1 | −1 | −1 | −1 | −1 |
| 13 | 1 | 1 | 1 | 1 | −1 | −1 | 1 | 1 |
| 14 | 1 | 1 | 1 | 1 | 1 | 1 | −1 | −1 |
| 15 | 1 | 1 | 1 | 1 | 1 | 1 | 1 | 1 |

FIG. 25

| m | $RI_{signature}$ #m={$C_0$, $C_1$, ⋯ , $C_6$, $C_7$} | | | | | | | |
|---|---|---|---|---|---|---|---|---|
| 0 | −1 | 1 | −1 | 1 | −1 | 1 | −1 | 1 |
| 1 | −1 | 1 | −1 | 1 | −1 | 1 | 1 | 1 |
| 2 | −1 | 1 | −1 | 1 | 1 | 1 | −1 | 1 |
| 3 | −1 | 1 | −1 | 1 | 1 | 1 | 1 | 1 |
| 4 | −1 | 1 | 1 | 1 | −1 | 1 | −1 | 1 |
| 5 | −1 | 1 | 1 | 1 | −1 | 1 | 1 | 1 |
| 6 | −1 | 1 | 1 | 1 | 1 | 1 | −1 | 1 |
| 7 | −1 | 1 | 1 | 1 | 1 | 1 | 1 | 1 |
| 8 | 1 | 1 | −1 | 1 | −1 | 1 | −1 | 1 |
| 9 | 1 | 1 | −1 | 1 | −1 | 1 | 1 | 1 |
| 10 | 1 | 1 | −1 | 1 | 1 | 1 | −1 | 1 |
| 11 | 1 | 1 | −1 | 1 | 1 | 1 | 1 | 1 |
| 12 | 1 | 1 | 1 | 1 | −1 | 1 | −1 | 1 |
| 13 | 1 | 1 | 1 | 1 | −1 | 1 | 1 | 1 |
| 14 | 1 | 1 | 1 | 1 | 1 | 1 | −1 | 1 |
| 15 | 1 | 1 | 1 | 1 | 1 | 1 | 1 | 1 |

FIG. 26

| S | $b_{s,0}, b_{s,1}, \cdots b_{s,31}$ | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 |
| 2 | 1 | 1 | 1 | 1 | −1 | −1 | −1 | −1 | 1 | 1 | 1 | 1 | −1 | −1 | −1 | −1 | 1 | 1 | 1 | 1 | −1 | −1 | −1 | −1 | 1 | 1 | 1 | 1 | −1 | −1 | −1 | −1 |
| 3 | 1 | 1 | −1 | −1 | −1 | −1 | 1 | 1 | 1 | 1 | −1 | −1 | −1 | −1 | 1 | 1 | 1 | 1 | −1 | −1 | −1 | −1 | 1 | 1 | 1 | 1 | −1 | −1 | −1 | −1 | 1 | 1 |
| 4 | 1 | 1 | 1 | 1 | 1 | 1 | 1 | 1 | −1 | −1 | −1 | −1 | −1 | −1 | −1 | −1 | 1 | 1 | 1 | 1 | 1 | 1 | 1 | 1 | −1 | −1 | −1 | −1 | −1 | −1 | −1 | −1 |
| 5 | 1 | 1 | −1 | −1 | 1 | 1 | −1 | −1 | −1 | −1 | 1 | 1 | −1 | −1 | 1 | 1 | 1 | 1 | −1 | −1 | 1 | 1 | −1 | −1 | −1 | −1 | 1 | 1 | −1 | −1 | 1 | 1 |
| 6 | 1 | 1 | 1 | 1 | −1 | −1 | −1 | −1 | −1 | −1 | −1 | −1 | 1 | 1 | 1 | 1 | 1 | 1 | 1 | 1 | −1 | −1 | −1 | −1 | −1 | −1 | −1 | −1 | 1 | 1 | 1 | 1 |
| 7 | 1 | 1 | −1 | −1 | −1 | −1 | 1 | 1 | −1 | −1 | 1 | 1 | 1 | 1 | −1 | −1 | 1 | 1 | −1 | −1 | −1 | −1 | 1 | 1 | −1 | −1 | 1 | 1 | 1 | 1 | −1 | −1 |
| 8 | 1 | 1 | 1 | 1 | 1 | 1 | 1 | 1 | 1 | 1 | 1 | 1 | 1 | 1 | 1 | 1 | −1 | −1 | −1 | −1 | −1 | −1 | −1 | −1 | −1 | −1 | −1 | −1 | −1 | −1 | −1 | −1 |
| 9 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 | 1 | 1 | −1 | −1 |
| 10 | 1 | 1 | 1 | 1 | −1 | −1 | −1 | −1 | 1 | 1 | 1 | 1 | −1 | −1 | −1 | −1 | 1 | 1 | 1 | 1 | −1 | −1 | −1 | −1 | 1 | 1 | 1 | 1 | −1 | −1 | −1 | −1 |
| 11 | 1 | 1 | −1 | −1 | −1 | −1 | 1 | 1 | 1 | 1 | −1 | −1 | −1 | −1 | 1 | 1 | −1 | −1 | 1 | 1 | 1 | 1 | −1 | −1 | −1 | −1 | 1 | 1 | 1 | 1 | −1 | −1 |
| 12 | 1 | 1 | 1 | 1 | 1 | 1 | 1 | 1 | −1 | −1 | −1 | −1 | −1 | −1 | −1 | −1 | −1 | −1 | −1 | −1 | −1 | −1 | −1 | −1 | 1 | 1 | 1 | 1 | 1 | 1 | 1 | 1 |
| 13 | 1 | 1 | −1 | −1 | 1 | 1 | −1 | −1 | −1 | −1 | 1 | 1 | −1 | −1 | 1 | 1 | −1 | −1 | 1 | 1 | −1 | −1 | 1 | 1 | 1 | 1 | −1 | −1 | 1 | 1 | −1 | −1 |
| 14 | 1 | 1 | 1 | 1 | −1 | −1 | −1 | −1 | −1 | −1 | −1 | −1 | 1 | 1 | 1 | 1 | −1 | −1 | −1 | −1 | 1 | 1 | 1 | 1 | 1 | 1 | 1 | 1 | −1 | −1 | −1 | −1 |
| 15 | 1 | 1 | −1 | −1 | −1 | −1 | 1 | 1 | −1 | −1 | 1 | 1 | 1 | 1 | −1 | −1 | −1 | −1 | 1 | 1 | 1 | 1 | −1 | −1 | 1 | 1 | −1 | −1 | −1 | −1 | 1 | 1 |

| S | $C_{s,0}, C_{m,0}, C_{s,1}, C_{m,1}, \cdots C_{s,15}, C_{m,15}$ |
|---|---|
| 0 | 1 1 1 1 1 1 1 1 1 1 1 1 1 1 1 1 1 1 1 1 1 1 1 1 1 1 1 1 1 1 1 1 |
| 1 | 1 1 -1 -1 1 1 -1 -1 1 1 -1 -1 1 1 -1 -1 1 1 -1 -1 1 1 -1 -1 1 1 -1 -1 1 1 -1 -1 |
| 2 | 1 1 1 1 -1 -1 -1 -1 1 1 1 1 -1 -1 -1 -1 1 1 1 1 -1 -1 -1 -1 1 1 1 1 -1 -1 -1 -1 |
| 3 | 1 1 -1 -1 -1 -1 1 1 1 1 -1 -1 -1 -1 1 1 1 1 -1 -1 -1 -1 1 1 1 1 -1 -1 -1 -1 1 1 |
| 4 | 1 1 1 1 1 1 1 1 -1 -1 -1 -1 -1 -1 -1 -1 1 1 1 1 1 1 1 1 -1 -1 -1 -1 -1 -1 -1 -1 |
| 5 | 1 1 -1 -1 1 1 -1 -1 -1 -1 1 1 -1 -1 1 1 1 1 -1 -1 1 1 -1 -1 -1 -1 1 1 -1 -1 1 1 |
| 6 | 1 1 1 1 -1 -1 -1 -1 -1 -1 -1 -1 1 1 1 1 1 1 1 1 -1 -1 -1 -1 -1 -1 -1 -1 1 1 1 1 |
| 7 | 1 1 -1 -1 -1 -1 1 1 -1 -1 1 1 1 1 -1 -1 1 1 -1 -1 -1 -1 1 1 -1 -1 1 1 1 1 -1 -1 |
| 8 | 1 1 1 1 1 1 1 1 1 1 1 1 1 1 1 1 -1 -1 -1 -1 -1 -1 -1 -1 -1 -1 -1 -1 -1 -1 -1 -1 |
| 9 | 1 1 -1 -1 1 1 -1 -1 1 1 -1 -1 1 1 -1 -1 1 1 -1 -1 1 1 -1 -1 1 1 -1 -1 1 1 -1 -1 |
| 10 | 1 1 1 1 -1 -1 -1 -1 1 1 1 1 -1 -1 -1 -1 1 1 1 1 -1 -1 -1 -1 1 1 1 1 -1 -1 -1 -1 |
| 11 | 1 1 -1 -1 -1 -1 1 1 1 1 -1 -1 -1 -1 1 1 -1 -1 1 1 1 1 -1 -1 -1 -1 1 1 1 1 -1 -1 |
| 12 | 1 1 1 1 1 1 1 1 -1 -1 -1 -1 -1 -1 -1 -1 -1 -1 -1 -1 -1 -1 -1 -1 1 1 1 1 1 1 1 1 |
| 13 | 1 1 -1 -1 1 1 -1 -1 -1 -1 1 1 -1 -1 1 1 -1 -1 1 1 -1 -1 1 1 1 1 -1 -1 1 1 -1 -1 |
| 14 | 1 1 1 1 -1 -1 -1 -1 -1 -1 -1 -1 1 1 1 1 -1 -1 -1 -1 1 1 1 1 1 1 1 1 -1 -1 -1 -1 |
| 15 | 1 1 -1 -1 -1 -1 1 1 -1 -1 1 1 1 1 -1 -1 -1 -1 1 1 1 1 -1 -1 1 1 -1 -1 -1 -1 1 1 |

FIG. 35

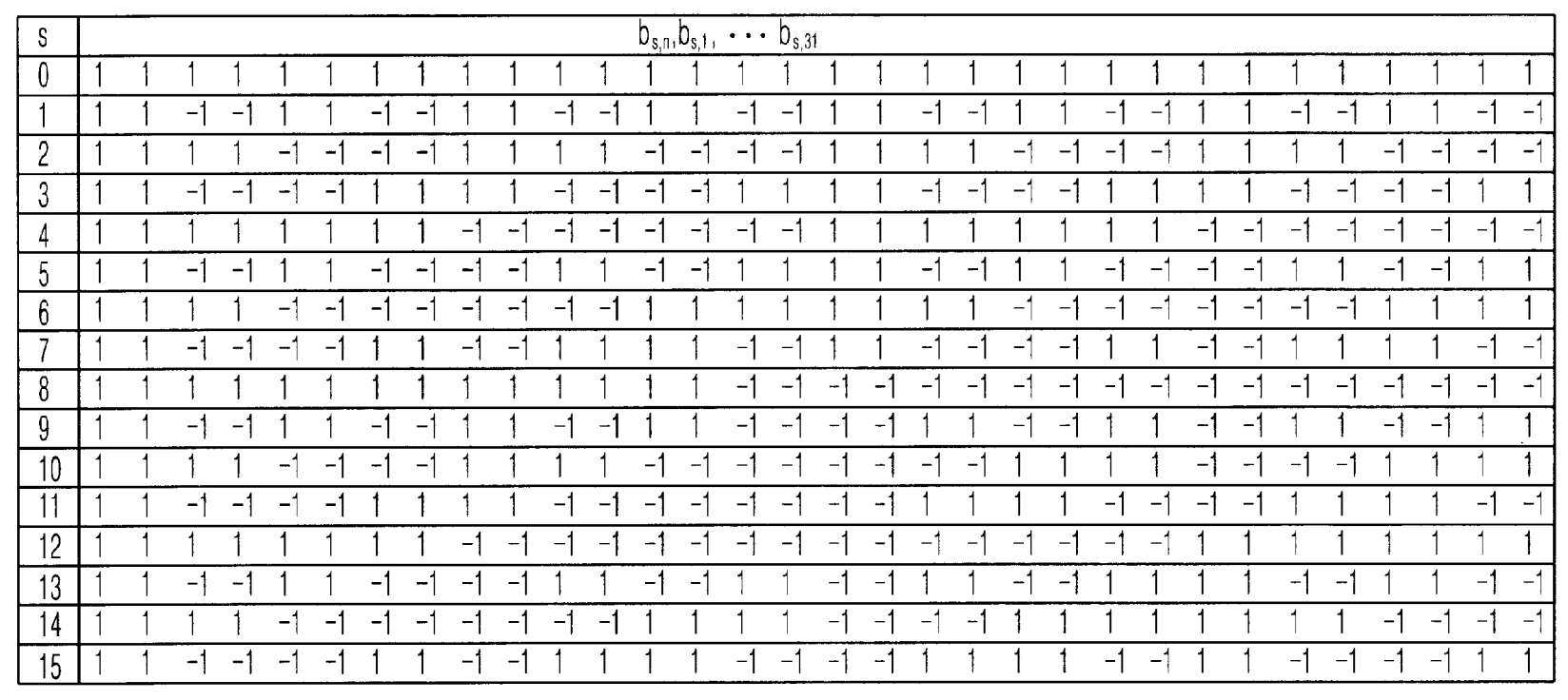

| s | $b_{s,n}, b_{s,1}, \cdots b_{s,31}$ | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 |
| 2 | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 |
| 3 | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 |
| 4 | 1 | 1 | 1 | 1 | 1 | 1 | 1 | 1 | -1 | -1 | -1 | -1 | -1 | -1 | -1 | -1 | 1 | 1 | 1 | 1 | 1 | 1 | 1 | 1 | -1 | -1 | -1 | -1 | -1 | -1 | -1 | -1 |
| 5 | 1 | 1 | -1 | -1 | 1 | 1 | -1 | -1 | -1 | -1 | 1 | 1 | -1 | -1 | 1 | 1 | 1 | 1 | -1 | -1 | 1 | 1 | -1 | -1 | -1 | -1 | 1 | 1 | -1 | -1 | 1 | 1 |
| 6 | 1 | 1 | 1 | 1 | -1 | -1 | -1 | -1 | -1 | -1 | -1 | -1 | 1 | 1 | 1 | 1 | 1 | 1 | 1 | 1 | -1 | -1 | -1 | -1 | -1 | -1 | -1 | -1 | 1 | 1 | 1 | 1 |
| 7 | 1 | 1 | -1 | -1 | -1 | -1 | 1 | 1 | -1 | -1 | 1 | 1 | 1 | 1 | -1 | -1 | 1 | 1 | -1 | -1 | -1 | -1 | 1 | 1 | -1 | -1 | 1 | 1 | 1 | 1 | -1 | -1 |
| 8 | 1 | 1 | 1 | 1 | 1 | 1 | 1 | 1 | 1 | 1 | 1 | 1 | 1 | 1 | -1 | -1 | -1 | -1 | -1 | -1 | -1 | -1 | -1 | -1 | -1 | -1 | -1 | -1 | -1 | -1 | -1 | -1 |
| 9 | 1 | 1 | -1 | -1 | 1 | 1 | -1 | -1 | 1 | 1 | -1 | -1 | 1 | 1 | -1 | -1 | -1 | -1 | 1 | 1 | -1 | -1 | 1 | 1 | -1 | -1 | 1 | 1 | -1 | -1 | 1 | 1 |
| 10 | 1 | 1 | 1 | 1 | -1 | -1 | -1 | -1 | 1 | 1 | 1 | 1 | -1 | -1 | -1 | -1 | -1 | -1 | -1 | -1 | 1 | 1 | 1 | 1 | -1 | -1 | -1 | -1 | 1 | 1 | 1 | 1 |
| 11 | 1 | 1 | -1 | -1 | -1 | -1 | 1 | 1 | 1 | 1 | -1 | -1 | -1 | -1 | -1 | -1 | -1 | -1 | 1 | 1 | 1 | 1 | -1 | -1 | -1 | -1 | 1 | 1 | 1 | 1 | -1 | -1 |
| 12 | 1 | 1 | 1 | 1 | 1 | 1 | 1 | 1 | -1 | -1 | -1 | -1 | -1 | -1 | -1 | -1 | -1 | -1 | -1 | -1 | -1 | -1 | -1 | -1 | 1 | 1 | 1 | 1 | 1 | 1 | 1 | 1 |
| 13 | 1 | 1 | -1 | -1 | 1 | 1 | -1 | -1 | -1 | -1 | 1 | 1 | -1 | -1 | 1 | 1 | -1 | -1 | 1 | 1 | -1 | -1 | 1 | 1 | 1 | 1 | -1 | -1 | 1 | 1 | -1 | -1 |
| 14 | 1 | 1 | 1 | 1 | -1 | -1 | -1 | -1 | -1 | -1 | -1 | -1 | 1 | 1 | 1 | 1 | -1 | -1 | -1 | -1 | 1 | 1 | 1 | 1 | 1 | 1 | 1 | 1 | -1 | -1 | -1 | -1 |
| 15 | 1 | 1 | -1 | -1 | -1 | -1 | 1 | 1 | -1 | -1 | 1 | 1 | 1 | 1 | -1 | -1 | -1 | -1 | 1 | 1 | 1 | 1 | -1 | -1 | 1 | 1 | -1 | -1 | -1 | -1 | 1 | 1 |

| m | $RI_{signature}$ #m={$C_0$, $C_1$, ··· , $C_6$, $C_7$} | | | | | | | |
|---|---|---|---|---|---|---|---|---|
| 0 | 1 | 1 | -1 | 1 | 1 | 1 | 1 | 1 |
| 1 | 1 | 1 | 1 | -1 | 1 | 1 | -1 | -1 |
| 2 | 1 | 1 | -1 | 1 | -1 | -1 | -1 | -1 |
| 3 | 1 | 1 | 1 | -1 | -1 | -1 | 1 | 1 |

| m | $RI_{signature}$ #m=1 | $RI_{signature}$ #m=0 |
|---|---|---|
| 0 | $\{b'_0, b'_1\}=\{1,1\}$ | $\{b'_0, b'_1\}=\{0,0\}$ |
| 1 | $\{b'_2, b'_3\}=\{1,1\}$ | $\{b'_2, b'_3\}=\{0,0\}$ |
| 2 | $\{b'_4, b'_5\}=\{1,1\}$ | $\{b'_4, b'_5\}=\{0,0\}$ |
| 3 | $\{b'_6, b'_7\}=\{1,1\}$ | $\{b'_6, b'_7\}=\{0,0\}$ |

| S | $C_{s,0}, C_{m,0}, C_{s,1}, C_{m,1}, \cdots C_{s,15}, C_{m,15}$ | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 | −1 | −1 |
| 3 | 1 | −1 | −1 | 1 | 1 | −1 | −1 | 1 | 1 | −1 | −1 | 1 | 1 | −1 | −1 | 1 |
| 4 | 1 | 1 | 1 | 1 | −1 | −1 | −1 | −1 | 1 | 1 | 1 | 1 | −1 | −1 | −1 | −1 |
| 5 | 1 | −1 | 1 | −1 | −1 | 1 | −1 | 1 | 1 | −1 | 1 | −1 | −1 | 1 | −1 | 1 |
| 6 | 1 | 1 | −1 | −1 | −1 | −1 | 1 | 1 | 1 | 1 | −1 | −1 | −1 | −1 | 1 | 1 |
| 7 | 1 | −1 | −1 | 1 | −1 | 1 | 1 | −1 | 1 | −1 | −1 | 1 | −1 | 1 | 1 | −1 |
| 8 | 1 | 1 | 1 | 1 | 1 | 1 | 1 | 1 | −1 | −1 | −1 | −1 | −1 | −1 | −1 | −1 |
| 9 | 1 | −1 | 1 | −1 | 1 | −1 | 1 | −1 | −1 | 1 | −1 | 1 | −1 | 1 | −1 | 1 |
| 10 | 1 | 1 | −1 | −1 | 1 | 1 | −1 | −1 | −1 | −1 | 1 | 1 | −1 | −1 | 1 | 1 |
| 11 | 1 | −1 | −1 | 1 | 1 | −1 | −1 | 1 | −1 | 1 | 1 | −1 | −1 | 1 | 1 | −1 |
| 12 | 1 | 1 | 1 | 1 | −1 | −1 | −1 | −1 | −1 | −1 | −1 | −1 | 1 | 1 | 1 | 1 |
| 13 | 1 | −1 | 1 | −1 | −1 | 1 | −1 | 1 | −1 | 1 | −1 | 1 | 1 | −1 | 1 | −1 |
| 14 | 1 | 1 | −1 | −1 | −1 | −1 | 1 | 1 | −1 | −1 | 1 | 1 | 1 | 1 | −1 | −1 |
| 15 | 1 | −1 | −1 | 1 | −1 | 1 | 1 | −1 | −1 | 1 | 1 | −1 | 1 | −1 | −1 | 1 |

FIG. 41

| S | $C_{s,0}, C_{m,0}, C_{s,1}, C_{m,1}, \cdots C_{s,15}, C_{m,15}$ | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | 1 | 1 | 1 | -1 | -1 | -1 | -1 | 1 | 1 | 1 | 1 | -1 | -1 | -1 | -1 |
| 2 | 1 | 1 | 1 | 1 | 1 | 1 | 1 | 1 | -1 | -1 | -1 | -1 | -1 | -1 | -1 | -1 |
| 3 | 1 | 1 | 1 | 1 | -1 | -1 | -1 | -1 | -1 | -1 | -1 | -1 | 1 | 1 | 1 | 1 |
| 4 | RESERVED | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |

METHOD FOR ALLOCATING PHYSICAL CHANNEL OF MOBILE COMMUNICATION SYSTEM AND COMMUNICATION METHOD USING THE SAME

CROSS-REFERENCE TO RELATED APPLICATIONS

Pursuant to 35 U.S.C. §119(a), this application claims the benefit of earlier filing date and right of priority to Korean Application No. 13842/2000, filed on Mar. 18, 2000, No. 13844/2000, filed on Mar. 18, 2000, No. 16168/2000, filed on Mar. 29, 2000, and No. 16171/2000, filed on Mar. 29, 2000, the contents of which are hereby incorporated by reference herein in their entirety.

BACKGROUND OF THE INVENTION

1. Field of the Invention

The present invention relates to a channel allocation technique of a third generation partnership project (3GPP), and more particularly to a method for allocating a physical channel of a mobile communication system that is capable of effectively allocating a physical channel of a RACH (Random Access Channel) and a CPCH (Common Packet Channel) having an up-link scrambling code, and a communication using the same.

2. Description of the Background Art

Generally, in the 3GPP system, the RACH and the CPCH, the up-link channels that a user terminal or a user equipment (UE) uses to transmit a data to a base station, uses 16 signatures and an OVSP (Orthogonal Variable Spreading Factor) code for allocating a physical channel.

That is, the terminal uses one of 16 signatures (Ap#s, #s=0, 1, 2, . . . , 15) to generate a preamble signature ($C_{sig,s}$), generages a random access preamble code ($C_{pre,n,s}$) by using the generated preamble signature ($C_{sig,s}$) and a specific physical RACH (PRACH) preamble scrambling code ($S_{r\text{-}pre,n}$) assigned per cell, carries the generated random access preamble code ($C_{pre,n,s}$) on an access preamble (AP) and transmits it to base station.

The random access preamble code ($C_{pre,n,s}$) is the sequence having a complex number value as shown in the below equation (1):

$$C_{pre,n,s}(k) = S_{r-pre,n}(k)\times C_{sig,s}(k)\times e^{j\left(\frac{\pi}{4}+\frac{\pi}{2}k\right)} \tag{1}$$

wherein, 'k' indicates a transmitted chip and is an integer of 0, 1, 2, . . . , 4096. Particularly, if 'k' is '0', it signifies the chip which is first transmitted for a corresponding time, 's' is a signature number and an integer of 0, 1, 2, . . . ,15.

First, the physical channel allocation method of the RACH will now be explained with reference to the accompanying drawings.

FIG. 1 is a diagram showing a construction of a code tree for allocating a physical channel of the RACH in accordance with a conventional art.

As shown in the drawing, as a spreading factor (SF) is increased, an OVSP code is accordingly increased. For example, as for the 16 signatures (AP#0-AP#15), if the spreading factor (SF) is 16, each signature and the OVSF (Orthogonal Variable Spreading Factor) code is in a one-to-one ratio. The AP#0-AP#15 indicates the types of signature carried on the AP and transmitted by the terminal.

FIG. 2 is a diagram showing a construction of the OVSF code tree in accordance with the conventional art, which corresponds to the RACH physical channel allocation code tree of FIG. 1. That is, each of the tree of FIG. 1 is coded to the OVSF code ($C_{ch,SF,K}$), having each value.

In the OVSF code (C ch,SF,k), the SF indicates a spreading factor, and 'k' indicates the order of the OVSF code. For example, in case of $Cch_{2,1}$, its SF is 2 and 'k' is '1', indicating that it is the second code of the OVSF code.

$C_{ch,SF,k}$ has a code value allocated to each node in the OVSF code tree, of which 'k' also signifies the number of the node. In this case, a code value allocated to the node is obtained by the following equations (2) and (3):

$$C_{ch,1,0} = 1 \tag{2}$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix} \tag{3}$$

$$\begin{bmatrix} C_{ch,2(n+1),0} \\ C_{ch,2(n+1),1} \\ C_{ch,2(n+1),2} \\ C_{ch,2(n+1),3} \\ \cdots \\ C_{ch,2(n+1),2(n+1)-2} \\ C_{ch,2(n+1),2(n+1)-1} \end{bmatrix} = \begin{bmatrix} C_{ch,2^n,0} & C_{ch,2^n,0} \\ C_{ch,2^n,0} & -C_{ch,1,0} \\ C_{ch,2^n,1} & C_{ch,2^n,1} \\ C_{ch,2^n,1} & -C_{ch,2^n,1} \\ \cdots & \\ C_{ch,2^n,2^n-1} & C_{ch,2^n,2^n-1} \\ C_{ch,2^n,2^n-1} & -C_{ch,2^n,2^n-1} \end{bmatrix} \tag{4}$$

The OVSF code is a channelization code, which uses two types of codes for a data portion and a control portion of a message to be transmitted. The method for determining the two types of codes will now be explained.

FIG. 3 is a diagram of an OVSF code tree for explaining the method for allocating the OVSF code for a message of the PRACH (Physical Random Access Channel) in accordance with the conventional art.

For the data portion and the control portion of a message to be transmitted, as shown in FIG. 3, the OVSF code is allocated according to a particular rule (or a formula) along the tree at the right side from the node corresponding to a signature of the terminal itself.

For example, reference to the code tree of FIG. 1, if the SF of the signature is 16, the SF of the OVSF code for the data portion of the message is 32~256, the SF of the OVSF code for the control portion is 256 constantly. Accordingly, the PRACHs used by each terminal is identified by the OVSF code. In this respect, the every PRACH uses the same PRACH message part scrambling code.

FIG. 4 is a diagram showing a communication procedure between a terminal and a base station through the RACH physical channel as allocated in accordance with the conventional art.

When the terminal carries a specific signature on the AP and transmits it through the physical channel of the RACH allocated in the method of FIG. 1, the base station transmits an acquisition indicator (AI) through the AICH (Acquisition Indicator Channel).

Then, the terminal determines an OVSF code which is available to itself from the node corresponding to an acquired signature and transmits a message (MSG) to the base station by using the available OVSF code and a specific PRACH message part scrambling code which is allocated by one for one cell. The message (MSG) includes the data part and the control part.

FIG. 5 is a diagram showing a structure of an AICH in use for the 3GPP system in accordance with the conventional art.

One AICH includes 15 access slots (AS; AS#0, AS#1, . . . , AS#14), and has the length of about 20 ms. One AS has the length of 40 bit.

The AS includes a 32 bit (a0, a1, a2, . . . , a31) AI (Acquisition Indicator) part and a 8 bit (a32, a33, . . . , a39) part which is not transmitted.

The 32 bit AI is allocated to inform whether a signature previously transmitted by the terminal can be available to use. Thus, as the terminal interprets the bit of the AI part, it is judged whether a signature used in the access preamble can be available for use.

FIG. 6 illustrates a table indicating the number of the AS corresponding to the RACH sub-channel in used for the 3GPP system.

As shown in the drawing, the 3GPP system includes 12 RACH sub-channel for use, of which each sub-channel includes available access slots according to the current system frame number (SFN). The SFN is information given to the terminal by a P-CCPCH (Primary Common Control Physical Channel) and is used for various timings.

FIG. 7 illustrates a construction of a system for spreading the message part of the PRACH in the terminal in accordance with the conventional art.

The control part of the PRACH message has a real value and is diffused by a channelization code (Cc). The data part of the PRACH message has a real value and is diffused by a channelization code (Cd).

The two types of diffused signals are respectively multiplied by gain factors (Ad, Ac) to generate signals having a weight, which are outputted to an 'I ' and a 'Q' branches.

Thereafter, the signal outputted to the 'I' branch and the signal outputted to the 'Q' branch are multiplied by a complex factor (j) to generate complex signals, which are added to be converted to a complex signal stream (I+jQ).

The complex signal stream is a complex scrambling code, which is multiplied by the PRACH message part scrambling code ($S_{r\text{-}msg,n}$) so as to to be scrambled. The $S_{r\text{-}msgn}$ and the PRACH preamble scrambling code $S_{r\text{-}msg,n}$ used in the AP are in a one-to-one ratio.

Likewise in the RACH physical channel allocation method, the physical channel allocation method of the CPCH of the conventional art will now be described with reference to the accompanying drawings.

In the b 3GPP system of the conventional art, the terminal generates a PCPCH access preamble code $C_{c\text{-}acc,n,s}$, by using the access preamble signature ($C_{sigs}$) produced by using one 16 signature AP#s (#s=0, 1, 2, . . . , 15) and a specific PRACH preamble scrambling code ($S_{c\text{-}acc,n}$) assigned per cell. Thereafter, the terminals carries the PCPCH access preamble code $C_{c\text{-}acc,n,s}$ on the access preamble (AP) and transmits it to the base station.

The PCPCH (Physical Common Packet Channel) access preamble code $C_{c\text{-}acc,n,s}$ is a sequence having a complex number value which is generated as shown in the below equation (5):

$$C_{c-acc,n,s}(k) = S_{c-acc,n}(k) \times C_{sig,s}(k) \times e^{j(\frac{\pi}{4}+\frac{\pi}{2}k)} \quad (5)$$

wherein, "k" indicates a transmitted chip, and if the 'k' is '0', it indicates a chip which is the very first transmitted for a corresponding time, and 's' is a signature number, which is an integer of 0, 1, 2, . . . , 15.

Also, the terminal generates a PCPCH CD preamble code (Cd-cd, n,s) by using the access preamble signature (Csig,s) generated by using one of the 16 signatures Ap#s (#s=0,1, 2, . . . , 15) and a specific PCPCH CD access preamble scrambling assigned per cell. Thereafter, the terminal carries the PCPCH CD preamble code on a CD preamble (referred to as 'CD', hereinafter) and then transmits it to the base station.

The PCPCH CD preamble code Cc-cd,n,s is a sequence having a complex number value generated in the below equation (6):

$$C_{c-cd,n,s}(k) = S_{c-Cd,n}(k) \times C_{sig,s}(k) \times^{j(\frac{\pi}{4}+\frac{\pi}{2}k)} \quad (6)$$

wherein 'k' indicates a transmitted chip and is an integer of 0, 1, 2, . . . , 4096.

FIG. 8 is a diagram of the OVSF code tree for explaining the OVSF code allocation method for the message of the CPCH in accordance with the conventional art.

The OVSF code is a channelization code (OVSF Orthogonal Variable Spreading Factor) and requires two types of codes for the data part and the control part of a message to be transmitted. All of the terminals acquired for the CPCH transmission select an OVSF code from the same OVSF code set and use it.

At this time, the OVSF code for the data part and the control part of the message to be transmitted is allocated a required OVSF code according to a particular rule (or a formula).

The SF of the OVSF code for the data part and the control part of the message is 32~256. In this case, the PCPCHs used by each terminal is identified by the PCPCH message part scrambling code, and the every PCPCH uses the same type of OVSF codes.

The $C_{ch,SF,k}$ signifies the OVSF code, the SF signifies the spreading factor, 'k' signifies the order of a code among the OVSF codes having a corresponding SF. That is, Cch,SF,k are code values allocated to each node in the OVSF code tree. This is as shown in FIG. 2 and the values are defined as the equations (2), (3) and (4).

Accordingly, 16 PCPCH message part scrambling codes are allocated per cell and a single PCPCH access preamble scrambling code is allocated for the AP of the 16 PCPCH message part scrambling codes. Each PCPCH message part scrambling code and the signature AP#s are in a one-to-one ratio. That is, the 16 signatures AP#0~AP#15 and the 16 PCPCH message part scrambling codes are in a one-to-one ratio.

FIG. 9 illustrates a communication procedure between the terminal and the base station through the allocated CPCH physical channel in accordance with the conventional art.

When the terminal carries a specific signature on the AP and transmits it to the base station, the base station transmits an AI (Acquisition Indicator), that is, an acquisition response signal, through an AP-AICH (Access Preamble—AICH) to the terminal.

Then, the terminal transmits a collision detection (CD) to the base station. Upon receipt of the CD, the base station transmits the acquisition indicator (AI) through the CD-AICH to the terminal.

In this respect, the CD uses AP#0~AP#15, the same type of signatures used for the AP. The PCPCH CD access preamble scrambling code uses another part of the PCPCH access preamble scrambling code.

Then, the terminal transmits its message (MSG) by using the available OVSH code and the PCPCH message part scrambling code corresponding to the signature acquired through the AP-AICH. This message (MSG0 includes the data part and the control part.

The AP-AICH and the CD-AICH use the same one down link scrambling code ($S_{dl,n}$) and different types of channelization codes.

The AP-AICH and the CD-AICH have the same structure as shown in FIGS. 5 and 6.

FIG. 10 is a diagram of a system for spreading the message part of the PCPCH in the terminal in accordance with the conventional art.

The control part of the PCPCH message has a real value and is diffused by the channelization code (Cc). The two types of diffused signals are multiplied by the gain factors (Ad, Ac) to generate signals each having a weight, which are then outputted to the 'I' and the 'Q' branches.

And then, the signal outputted to the 'I' branch and a complex signal obtained as the signal outputted to the 'Q' branch is multiplied by a complex factor (j) are added and converted to a complex signal stream (I+jQ). As a complex scrambling code, the complex signal stream is multiplied by the PCPCH message part scrambling code ($S_{c\text{-}msg,n}$) to be scrambled. At this time, the $S_{c\text{-}msg,n}$ is in a one-to-one ratio with the PCPCH preamble scrambling code $S_{c\text{-}msg,n}$ used for the AP.

Accordingly, as for the physical channel allocation method for the RACH in accordance with the conventional art, since one PRACH preamble scrambling code is allocated to one cell and the RACH message part scrambling code for the message part to be transmitted are in the one-to-one ratio with the PRACH preamble scrambling code, the PRACH is not possibly re-used. In this respect, the PRACH message part scrambling code and the PRACH preamble scrambling code in the one-to-one ratio use different parts of the same long code.

In addition, as for the physical channel allocation method for the CPCH in accordance with the conventional art, since one PCPCH preamble scrambling code is allocated to one cell and the CPCH message part scrambling code for the message part to be transmitted are in the one-to-one ratio with the PCPCH preamble scrambling code, the PRACH is not possibly re-used. In this respect, the PCPCH message part scrambling code and the PCPCH preamble scrambling code in the one-to-one ratio use different parts of the same long code.

SUMMARY OF THE INVENTION

Therefore, an object of the present invention is to provide a physical channel allocation method of a mobile communication system that is capable of effectively allocating several signatures and a remaining up-link scrambling code per cell in a 3GPP system.

Another object of the present invention is to provide a physical channel allocation method of a mobile communication which is capable of effectively allocating a physical channel to allocate plural signatures and plural PRACH preamble scrambling codes per cell in a 3GPP system.

Still another object of the present invention is to provide an AICH structure suitable for allocating plural signatures and plural PRACH preamble scrambling codes per cell in a 3GPP system.

Yet another object of the present invention is to provide a physical channel allocation method of a mobile communication that is capable of effectively allocating a physical channel to allocate 16 signatures and plural PRACH preamble scrambling codes per cell in a 3GPP system.

Another object of the present invention is to provide an AICH structure suitable for allocating 16 signatures and plural PRACH preamble scrambling codes per cell in a 3GPP system.

Another object of the present invention is to provide a physical channel allocation method of a mobile communication that is capable of effectively allocating a physical channel to allocate plural signatures and plural PCPCH preamble scrambling codes per cell in a 3GPP system.

Another object of the present invention is to provide an AICH structure suitable for allocating plural signatures and plural PCPCH preamble scrambling codes per cell in a 3GPP system.

Another object of the present invention is to provide a physical channel allocation method of a mobile communication that is capable of effectively allocating a physical channel to allocate 16 signatures and plural PCPCH preamble scrambling codes per cell in a 3GPP system.

Another object of the present invention is to provide an AICH structure suitable for allocating 16 signatures and plural PCPCH preamble scrambling codes per cell in a 3GPP system.

Another object of the present invention is to provide a fresh physical random access procedure.

Another object of the present invention is to provide a physical channel allocation method of a mobile communication system that is capable of effectively allocating 16 signatures and more than 16 PCPCH access preambles (or PCPCH message part scrambling codes) per cell in consideration of a reuse factor.

Another object of the present invention is to provide a communication method of a mobile communication system by using a physical channel allocated by the plural signatures and plural PRACH preamble scrambling codes per cell.

According to a first feature of the present invention, in case that plural PRACH preamble scrambling codes (SC#m) for one cell in consideration of a reuse of the PRACH in a 3GPP system, a terminal transmits an access preamble (AP) by using one of 16 signatures (AP#s (s=0, . . . , 15) and a SC#m, one of PRACH preamble scrambling codes allocated to a corresponding cell to receive the PRACH.

According to a second feature of the present invention, when the transmitted AP is acquired by a base station according to the first feature, the terminal transmits its message by using a PRACH message part scrambling code MSC#m which is in a one-to-one ratio with the PRACH preamble scrambling ode SC#m used in the AP. In this case, the SC#m and the MSC#m are in a one-to-one ratio, and it would be more effective for the two codes to use a different part of the same code to each other.

According to a third feature of the present invention, in a terminal adopting the first feature, a signature available for the AP and the PRACH preamble scrambling code may be restricted by a higher layer for transmission of a corresponding RACH, for which an access service class (ASC) may be used.

According to a fourth feature of the present invention, for the AP transmitted from the terminal adopting the first through the third features, the base station informs whether the AP is allowable through plural AICHs (Acquisition Indicator Channel). In this case, the number of the AICHs is determined depending on the number of the PRACH preamble scrambling codes allocated to a corresponding cell. For example, different AICHs are responsible for acquisition of the AP using the different PRACH preamble scrambling codes SC#m. In this case, the SC#m, the SMC#m and the AICH#m are in a 1:1:1 ratio.

According to a fifth feature of the present invention, the AICHs according to the fourth feature commonly use a down-link scrambling code.

According to a sixth feature of the present invention, each AICH#m according to the fourth feature use different OVSF codes as a channelization code. That is, a channelization code $C_{ch,S\ FM,Km}$ are in a 1:1 ratio.

According to seventh feature of the present invention, the SC#m, the MSC#m, the AICH#m and $C_{ch,S\ FM,Km}$ in a 1:1:1:1 ratio.

According to an eighth feature of the present invention, if reuse of the PRACH is considered in the 3GPP system, in order for the terminal to be allocated with the PRACH to transmit a data to the base station, the terminal transmits an access preamble (AP) by using one of 16 signatures Ap#s (s=0, . . . ,15) and a SC#m, one of PRACH preamble scrambling codes allocated to a corresponding cell.

According to a ninth feature of the present invention, when the transmitted AP is acquired by the base station, the terminal transmits its message by using the PRACH message part scrambling code which is 1:1 ratio with the PRACH preamble scrambling code SC#m used in the access preamble.

According to a tenth feature, in order to transmit the RACH of the terminal adopting the eighth feature, a signature available in the access preamble and the PRACH preamble scrambling code are determined by an access service class (ASC) defined by a higher layer.

According to an eleventh feature of the present invention, the base station informs whether the access preamble transmitted from the terminal adopting the eighth to tenth features is allowable and general information on the current RACH through an AICH (Acquisition Indicator Channel) or a fresh physical channel (the fresh physical channel will be referred to as an 'RRICH (RACH Reuse Indication Channel), hereinafter).

According to a twelfth feature of the present invention, for the access preamble transmitted from the terminal adopting the eighth to tenth features, the base station corrects the typical AICH structure and informs whether the access preamble is allowable through the corrected AICH.

According to a thirteenth feature of the present invention, the fresh physical channel (RRICH) having the eleventh feature utilizes the time during which bit transmission discontinues in one access slot (AS) of the typical AICH used for the RACH. Referring to the typical AICH used for the RACH, bits are transmitted for some time within one AS having the time length of 20/15 msec and the transmission discontinues for the other remaining time. At this time, in order to minimize a complexity of hardware, the RRICH uses the same type of scrambling code and a channel identification code as those of the AICH. In this respect, however, a different type of codes may be used as necessary.

According to a fourteenth feature of the present invention, the information transmission unit of the fresh physical channel (RRICH) having the tenth to thirteenth features is the same as the access slot used by the typical AICH. That is, the transmitted information within one access slot having the length of 20/15 msec is used as one information unit.

According to a fifteenth feature of the present invention, the information transmission unit of the fresh physical channel having the eleventh to thirteenth feature are the same as the 15 units of the access slot used by the typical AICH as necessary. That is, the fresh physical channel (RRICH) uses the transmitted information within the 15 access slots having the length of 20 msec as one information unit.

According to sixteenth feature of the present invention, in case that 16 signatures AP#s (s=0, . . . , 15) and 'x' number of PCPCH scrambling codes per cell are allocated in consideration of reuse of the PCPCH in the 3GPP system, 'x' number of PCPCH scrambling codes are classified by 'y' number of CPCH code channels. At this time, the PCPCH scrambling codes belonging to each CPCH code channel is used for a PCPCH message part scrambling code, of which two PCPCH scrambling codes are selected to be used for a PCPCH access preamble scrambling code and a PCPCH CD access preamble scrambling code.

For example, if 'x'=64, y=4. That is, 4 CPCH code channels (code-channel#0~code-channel#3) are generated, and code-channel#m has 16 PCPCH scrambling code.

According to a seventeenth feature of the present invention, in case that 16 signatures AP#s (s=0, 15) and 'x' number of PCPCH scrambling code per cell are allocated in consideration of reuse of the PCPCH in the 3GPP system, in order for the terminal to be allocated the PCPCH, the terminal transmits the AP by using one of 16 signatures AP#s and one of the PCPCH access preamble scrambling code APS#m (m=0,. . . . , 15) allocated to a corresponding cell.

According to an eighteenth feature of the present invention, in case that 16 signatures AP#s (s=0, . . . , 15) and 'x' number of PCPCH scrambling codes per cell are allocated in consideration of reuse of the PCPCH in the 3GPP system, in order for the terminal to be allocated the PCPCH, the terminal transmits the CD by using one of the 16 signatures AP#s and one of the PCPCH CD access preamble scrambling codes CD-APSC#m (m=0, . . . , M) allocated to the corresponding cell.

According to a nineteenth feature of the present invention, in order to the terminal adopting the sixteenth to the eighteenth features to transmit the CPCH, the signature and the PCPCH access preamble scrambling code (or PCPCH CD access preamble scrambling code) available for use in the AP (or the CD) are defined by the higher layer. In this case, an access service class (ASC) concept may be used for the higher layer.

According to a twentieth feature of the present invention, the AP and the CD transmitted according to the sixteenth to nineteenth features are acquired by the base station, the terminal transmits its message by using the PCPCH message part scrambling code MSC#n. At this time, the MSC#n is determined uniquely by the APSC#m and the AP#s used in the AP. That is, if the CPCH code channel to which the APSC#m belongs is the code-channel#m, the MSC#n is determined by the AP#s. The APSC#m and the MSC#n are codes belonging to the code-channel#m defined in the first feature of the present invention, and the correlation of 'm', 's' and 'n' are previously defined.

According to twenty-first feature of the present invention, in response to the AP and the CD transmitted by the terminal having the above features, the base station informs whether they are allowable through several AP-AICHs and CD-AICHs. In this case, the number of the AICHs is determined depending on the number of the PCPCH scrambling codes allocated to the corresponding cell. For example, in case that there are four CPCH code channels (code-channel#0~code-channel#3), four AP-AICHs and four CD-AICHs are required. That is, the AP-AICH#m is charged with the acquisition of the AP using the APSC#m and the CD-AICH#m is charged with the acquisition of the CD using the CD-APS#m. In this case, the APSC#m and the AP-AICH#m are in the 1:1 ratio and the CD-APSC#m and the CD-AICH#m are in the 1:1 ratio.

According to twenty-second feature of the present invention, the AP-AICHs and the CD-AICHs according to the twenty-first feature commonly use one down-link scrambling code. In this respect, all kinds of AICHs use different OVSF codes as a channelization code. That is, the AP-AICH#m and its channelization code $C^{AP}{}_{ch,SFm,km}$ are in a 1:1 ratio, and the CD-ALCH#m and its channelization code CD-AICH#m are in a 1:1 ratio. And, an arbitrary $C^{AP}{}_{ch,SFm,km}$ and an arbitrary $C^{CD}{}_{ch,SFm,km}$ are different to each other.

According to twenty-third feature of the present invention, the AP-AICHs having the twenty-first feature commonly use one down-link scrambling code, and the CD-AICHs also use commonly one down-link scrambling code. In this respect, however, the down-link scrambling code used by the AP-AICHs and the down-link scrambling code used by the CD-AICHs are to be different, and thus, there exist two down-link scrambling codes. Each AP-AICH use a different OVSF code as a channelization code, and each CD-AICH use a different OVSF code as a channelization code. That is, the AP-AICH#m and its channelization code $C^{AP}{}_{ch,SFm,km}$ are in a 1:1 ratio, and the CD-AICH#m and its channelization code $C^{CD}{}_{ch,SFm,km}$ are also in a 1:1 ratio. However, an arbitrary $C^{AP}{}_{ch,SFm,km}$ and an arbitrary $C^{CD}{}_{ch,SFm,km}$ may be the same or different to each other.

According to the twenty-fourth feature, in the 3GPP system, in case that 16 signatures AP#s (s=0, . . . , 15) and 'x' number of PCPCH scrambling codes per cell are allocated in order to reuse the PCPCH, the 'x' number of PCPCH scrambling codes are classified by 'y' number of code groups. The PCPCH scrambling codes belonging to each code group is used as a PCPCH message part scrambling code, of which two PCPCH message part scrambling codes are selected to be used as a PCPCH access preamble scrambling code and a PCPCH CD access preamble scrambling code. For example, if 'x'=64, y=4. That is, four code groups are generated and each code group has 16 PCPCH scrambling codes.

According to the twenty-fifth feature, in case where reuse of the PCPCH is considered in the 3GPP system, in order for the terminal to be allocated the PCPCH, the terminal transmits an access preamble (AP) by using one of the 16 signatures AP#s (s=0, . . . , 15) and one of the PCPCH access preamble scrambling codes APSC#m (m=0, . . . , M) allocated to the corresponding cell.

According to the twenty-sixth feature of the present invention, in case where reuse of the PCPCH is considered in the 3GPP system, in order to the terminal to be allocated the PCPCH, the terminal transmits a collision detecting CD by using one of the 16 signatures AP#s and one of PCPCH CD access preamble scrambling codes CD-APSC#m (m=0, . . . , M) allocated to the corresponding cell.

According to the twenty-seventh feature of the present invention, in order for the terminal having the twenty-fifth and the twenty-sixth features to transmit the CPCH, the signature available for use in the AP (or the CD) and the PCPCH access preamble scrambling code (or the PCPCH CD access preamble scrambling code) are determined depending on the higher layer. In this case, a concept of an access service class (ASC) may be used.

According to the twenty-eighth feature, the AP and the CD transmitted according to the twenty-fifth and the twenty-sixth features are acquired by the base station, the terminal transmits its message by using the PCPCH message part scrambling code MSC#n. At this time, when a code group is determined by the APSC#m, the MSC#n is determined by the AP#s. The APSC#m and the MSC#n belong to the same code group defined in the first feature of the present invention.

According to a twenty-ninth feature of the present invention, the base station informs whether the AP and the CD transmitted by the terminal having the twenty-fifth and the twenty-sixth features is allowable and of the current general information through the conventional AICH and/or a fresh physical channel (the fresh physical channel will be referred to as a CRICH(CPCH Reuse Indicator Channel, hereinafter).

According to the thirtieth feature of the present invention, the base station informs whether the AP transmitted by the terminal having the twenty-fifth and the twenty-sixth features is allowable through a corrected AICH after the structure of the conventional AICH is corrected. This method is an alternative of the sixth feature of the present invention.

According to the thirty-first feature of the present invention, the fresh physical channel (CRICH) uses the time during which transmission of bits is stopped in an access slot (AS) of the conventional AICH used for the CPCH. As for the conventional AICH used for the CPCH, the bits are transmitted for some is time of one AS having the time length of 20/15 msec and the transmission of bits are discontinued for the other remaining time. In this case, in order to minimize the complexity of the hardware, the CRICH uses the same type of scrambling code and channel identifying code as those of the AICH. In this respect, however, a different type of scrambling code and a channel identifying code may be used.

According to thirty-second feature of the present invention, the information transmission unit of the fresh physical channel (CRICH) according to the twenty-ninth and the thirty-first features are the same as one unit of the access slot used by the conventional AICH. For example, the information transmitted within one access slot having the time length of 20/15 msec is used as one information unit.

According to a thirty-third feature of the present invention, the information transmission unit of the fresh physical channel (CRICH) according to the twenty-ninth and the thirty-first features is used in the same manner as the 15 units of the access slot used by the conventional AICH as required.

To achieve these and other advantages and in accordance with the purpose of the present invention, as embodied and broadly described herein, there is provided a communication method of a mobile communication system including: a step in which a terminal carries a preamble signature code (Csig,s) generated by using one of a plurality of signatures (AP#s) and a physical channel (PRACH) access preamble code (Cpre,n,s) of a first up-link generated by using one (SC#i) of 'x' number of physical channel (PRACH) preamble scrambling codes (SC#m) of the first up-link allowed to a corresponding cell, on an access preamble (AP), and transmits them to a base station through a channel (RACH) of the first up-link; a step in which the terminal receives an AI from the base station which decodes the signature included in the received AP and the type of the physical channel (PRACH) scrambling code of the first up-link and generates the AL informing whether the signature is available for use through a channel (AICH#m) of a first down-link; and a step in which the terminal transmits its message to the base station by using a channelization code that is determined by an acquired signature and the physical channel (PRACH) message part scrambling code (MSC#m) of the first up-link.

To achieve the above object, there is also provided a communication method of a mobile communication system including: a step in which a terminal carries a preamble signature code (Csig,s) generated by using one of a plurality of signatures (AP#s) and a PRACH access preamble code (Cpre,n,s) generated by using one (SC#i) of 'x' number of PRACH preamble scrambling codes (SC#m) allowed to a corresponding cell, on an access preamble (AP), and transmits them to a base station through RACH; a step in which the terminal receives an AI from the base station which decodes the signature included in the received AP and the type of the PRACH scrambling code and generates the AI informing whether the signature is available for use through a AICH#m; and a step in which the terminal transmits its message to the base station by using a channelization code that is determined by an acquired signature and the PRACH message part scrambling code (MSC#m).

The communication method of the mobile communication system includes an RRICH#m (Reuse RACH Indicator Channel) in consideration of a reuse factor of the RACH.

To achieve the above object, there is also provided a communication method of a mobile communication system including: a step in which a terminal carries a preamble signature code (Ca-acc,s) generated by using one of a plurality of signatures (AP#s) and a physical channel (PCPCH-CD) access preamble code (Cc-cd,n,s) of a second up-link generated by using one (CDSC#i) of 'y' number of physical channel (PCPCH-CD) preamble scrambling codes (CDSC#m) of the second up-link allowed to a corresponding cell, on an collision detecting preamble (CD), and transmits them to a base station through a channel (CPCH) of the first up-link; and a step in which the terminal receives an AI from a base station which generates the AI informing whether the CD for detecting a collision would meet a collision, through a channel (CD-AICH#m) of a second down-link.

To achieve the above object, there is also provided a communication method of a mobile communication system including: a step in which a terminal carries a preamble signature code (Csig,s) generated by using one of a plurality of signatures (AP#s) and a PCPCH access preamble code (Cpre,n,s) generated by using one (APSC#i) of 'x' number of PCPCH preamble scrambling codes (APSC#m) allowed to a corresponding cell, on an access preamble (AP), and transmits them to a base station through a CPCH; a step in which the terminal receives an AI from the base station which decodes the signature included in the received AP and the type of the PCPCH scrambling code and generates the AI informing whether the signature is available for use, through an AP-AICH#m; a step in which the terminal transmits its message to the base station by using a channelization code that is determined by the acquired signature and the physical channel (PRACH) message part scrambling code (MSC#m); a step in which the terminal carries a preamble signature code (Ca-acc,s) generated by using one of a plurality of signatures (AP#s) and a PCPCH-CD access preamble code (Cc-cd,n,s) generated by using one (CDSC#i) of 'y' number PCPCH-CD preamble scrambling codes (CDSC#m) allowed to a corresponding cell, on an collision detecting preamble (CD), and transmits them to a base station through the CPCH; a step in which the terminal receives an AI from a base station which generates the AI informing whether the CD for detecting a collision would meet a collision, through CD-AICH#m; and a step in which the terminal transmits its message to the base station by using the channelization code determined by the acquired signature and the PRACH message part scrambling code (MSC#m).

According to the communication method of a mobile communication system, the AP-AICH#m includes AP-CRICH#m, and the CD-AICH#m includes a CD-CRICM#m.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 12 illustrates a table defining sub-channels belonging to a channel code and corresponding access slots, in which the definition of the slots are the same in the sub-channels;

FIGS. 13A through 13D illustrate a first example of a table defining sub-channels belonging to a channel code and corresponding access slots, in which the definition of the slots are different in the sub-channels;

FIGS. 14A through 14D illustrate a first example of a table defining sub-channels belonging to a channel code and corresponding access slots, in which the definition of the slots are different in the sub-channels;

FIGS. 23 through 25 is tables showing an RI signature pattern of the RRICH#m in accordance with the present invention.

FIG. 26 is a table showing a signature pattern for an AICH in accordance with the present invention;

FIG. 35 is a table showing a signature pattern used by the AP-AICH#m and the CD-AICH#m in accordance with the present invention;

FIG. 41 is a table showing a signature pattern for the RI portion of the AICH in accordance with the present invention.

DETAILED DESCRIPTION OF THE PREFERRED EMBODIMENTS

Figure 1:
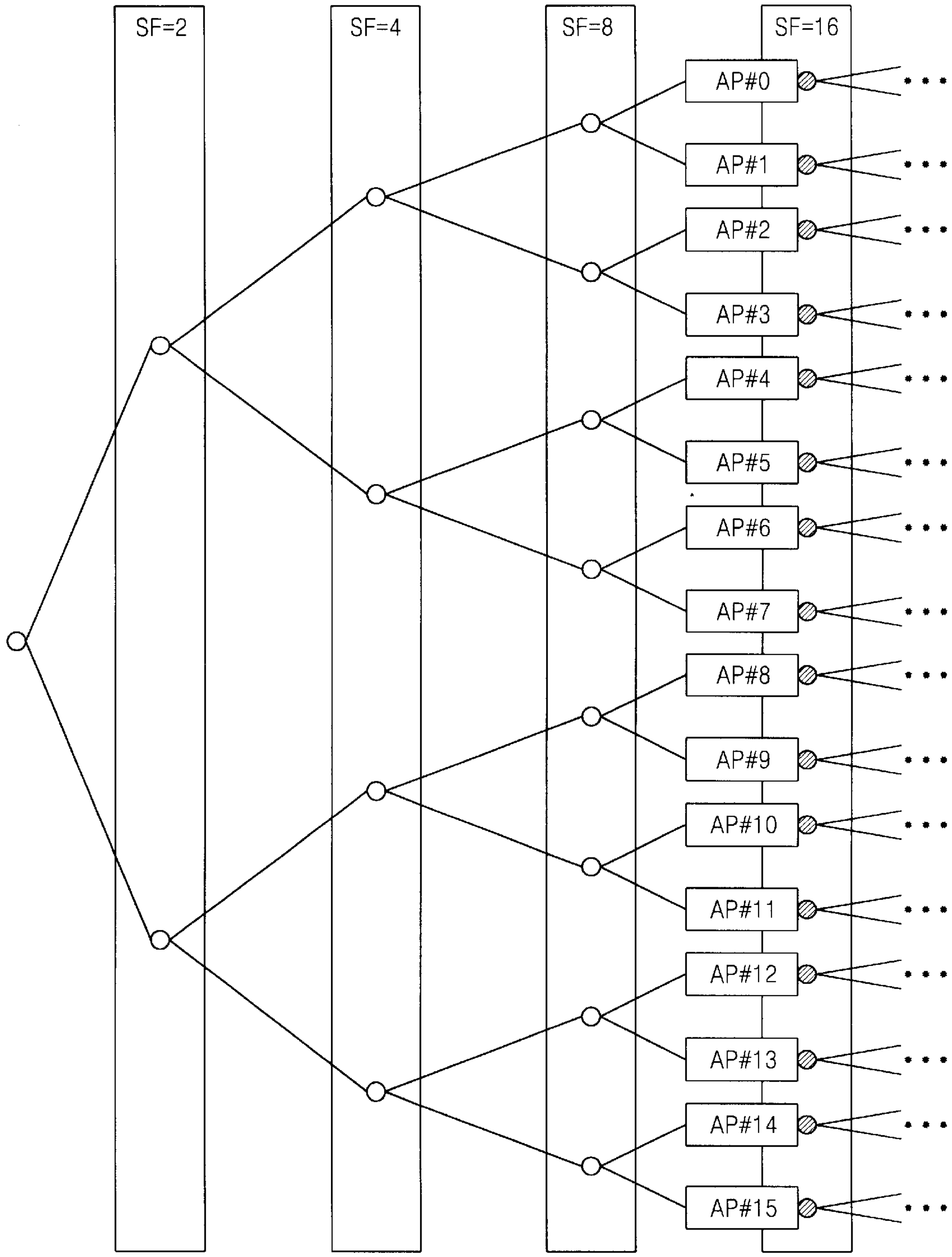
FIG. 1 is a diagram showing a construction of a code tree for allocating a physical channel of the RACH in accordance with a conventional art.
Figure 2:
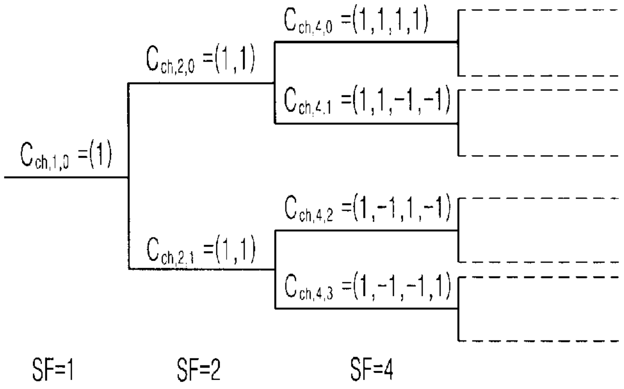
FIG. 2 is a diagram showing a construction of the OVSF code tree in accordance with the conventional art.
Figure 3:
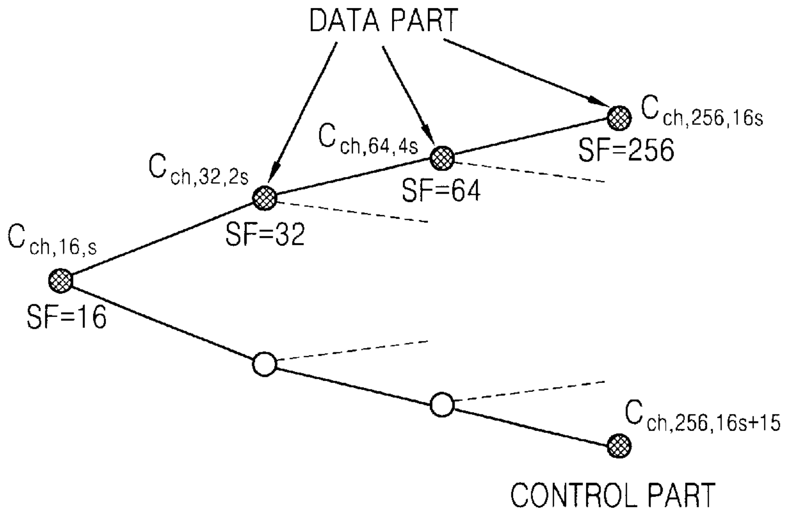
FIG. 3 is a diagram of an OVSF code tree for explaining the method for allocating the OVSF code for a message of the PRACH in accordance with the conventional art.
Figure 4:
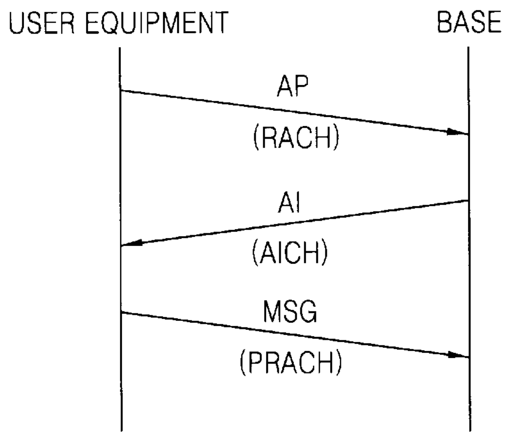
FIG. 4 is a diagram showing a communication procedure between a terminal and a base station through the RACH physical channel as allocated in accordance with the conventional art.
Figure 5:
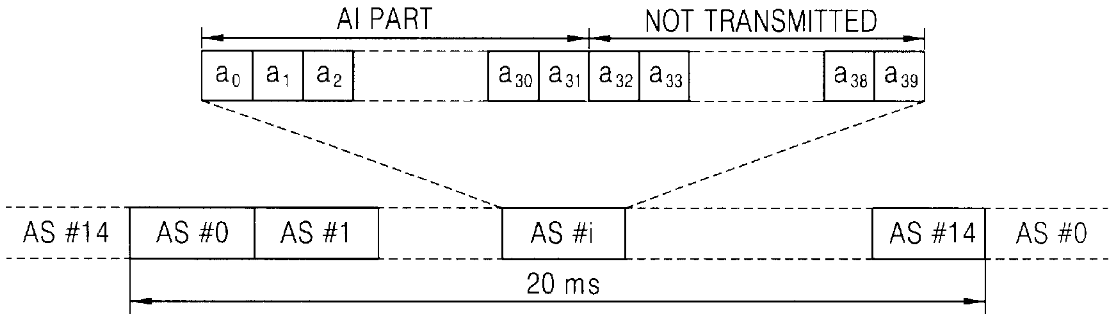
FIG. 5 is a diagram showing a structure of an AICH in use for the 3GPP system in accordance with the conventional art.
Figures 6, 7:
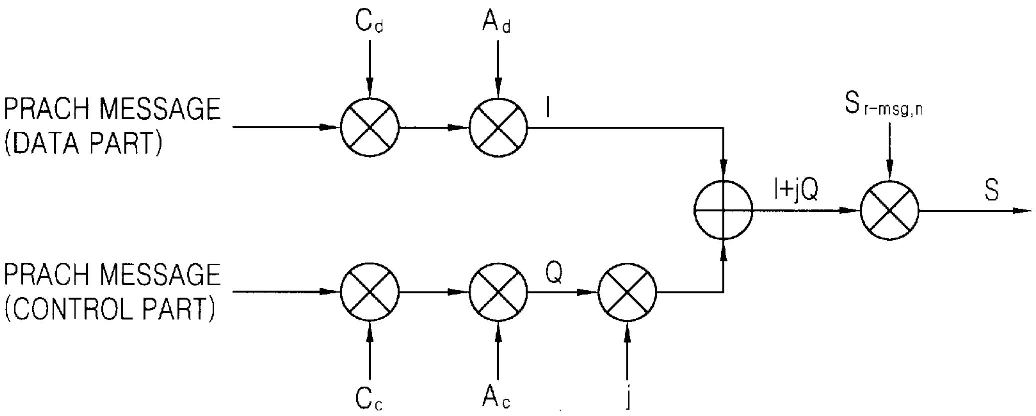
FIG. 6 illustrates a table indicating the number of the AS corresponding to the RACH sub-channel in used for the 3GPP system.
FIG. 7 illustrates a construction of a system for spreading the message part of the PRACH in the terminal in accordance with the conventional art.
Figure 8:
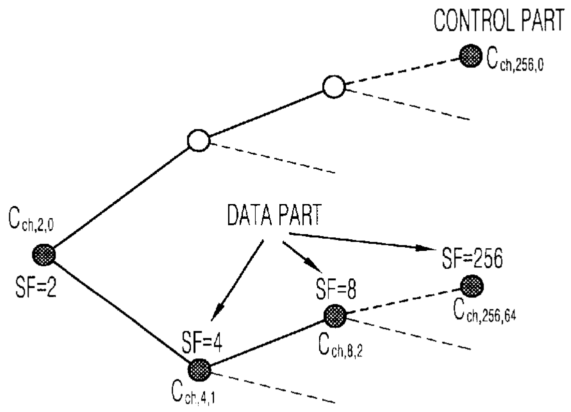
FIG. 8 is a diagram of the OVSF code tree for explaining the OVSF code allocation method for the message of the CPCH in accordance with the conventional art.
Figure 9:
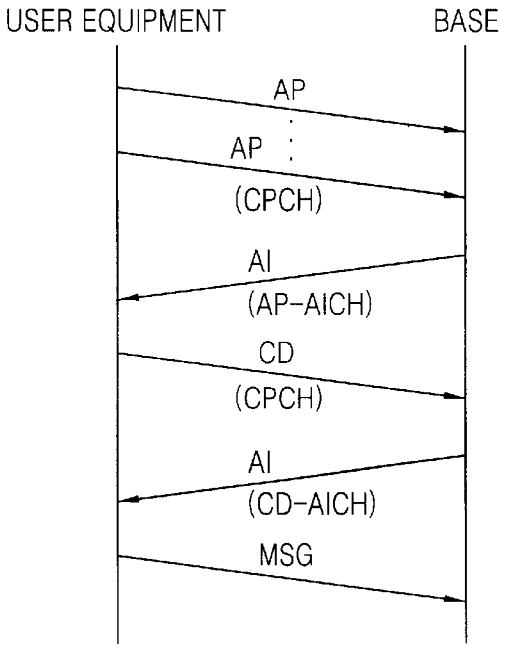
FIG. 9 illustrates a communication procedure between the terminal and the base station through the allocated CPCH physical channel in accordance with the conventional art.
Figure 10:
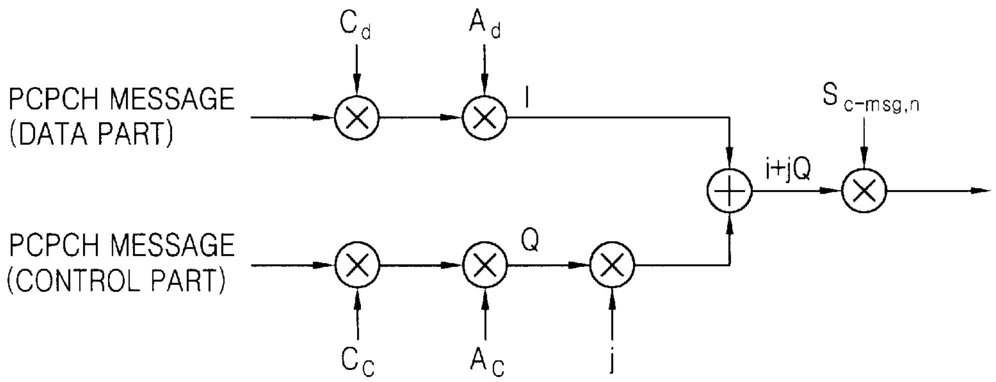
FIG. 10 is a diagram of a system for spreading the message part of the PCPCH in the terminal in accordance with the conventional art.
Figure 11:
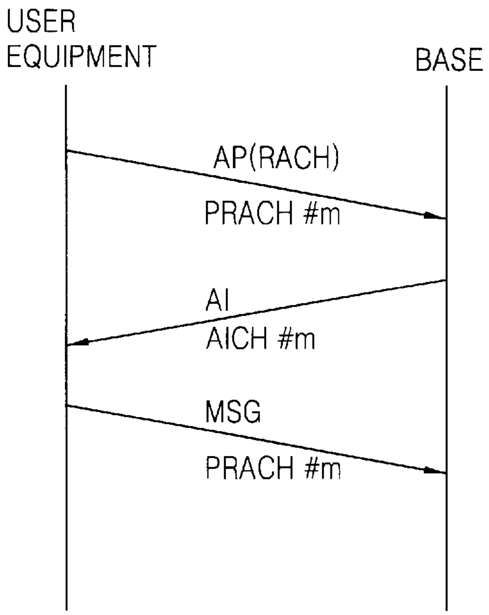
FIG. 11 shows the communication procedure of a mobile communication system in accordance with the present invention.

FIG. 11 is a flow chart illustrating a communication procedure of a mobile communication system in accordance with the present invention. First, a physical channel allocation method in accordance with the present invention will now be described in detail with reference to accompanying FIGS. 12~19.

A user terminal or a UE (User Equipment) generates an AP (Access Preamble) by using the physical channel allocation method in accordance with the present invention, and transmits the generated AP to a base station.

First, the terminal transmits the AP by using a preamble signature $C_{sig,s}$ generated by using one signature among 16 signatures (AP#s, #s=0, 1, 2, . . . , 15) and one PRACH preamble scrambling code among a x-number of PRACH preamble scrambling codes (SC#m, #m=0, 1, 2, . . . , x) permitted to the pertinent cell.

The SC#m is an expression for describing the present invention, it is the same expression with above-described $S_{r\text{-}pre,n}$.

The x is a number determining a reuse factor of the pertinent cell, it can be determined in system design, its range is $1 \leqq x \leqq X$ (maximum value). For example, when the x is 1, it describes the conventional system which does not consider the reuse factor, when the x is X, it describes a case using the PRACH preamble scrambling code (SC#m) allotted to each cell, it means a system considering the reuse factor to the utmost.

For example, when the X is 16, the range of x is $1 \leqq x \leqq 16$.

When the terminal generates the AP in order to transmit a RACH through a PRACH, the actual usable signature AP#s and PRACH preamble scrambling code SC#m can be limited wherever the each pertinent RACH is transmitted. In other words, the AP#s and SC#m can be determined by an ASC (Access Service Class) given by the superior layer of a protocol.

When the actual usable signature AP#s and PRACH preamble scrambling code SC#m of the terminal are limited by the ASC, before a physical random access procedure for the RACH transmission starts, the superior layer has to inform several items defined in accordance with the each ASC to the terminal. The several items have to include information about usable signatures, RACH code channel group, RACH sub-channel of the each RACH code channel in the RACH code channel group defined in accordance with the each ASC.

Herein, the RACH code channel group means a set consisted with several RACH code channels among the total 16 (=X) RACH code channels, and the RACH sub-channel group means a set consisted with several RACH sub-channels among the total 12 RACH sub-channels. Herein, the each RACH code channel grasps definitions about the sub-channels included in itself. In other words, the 16 RACH code channels grasp definitions about the RACH sub-channels included in each RACH code channel and access slots corresponding to them. The RACH sub-channels included in the RACH code channel and access slots corresponding to them can be defined differently or as same in accordance with the RACH code channel.

FIG. 12 is graphs illustrating the RACH sub-channels included in the each RACH code channel and access slots corresponding to them which are defined as same about the all RACH code channels.

FIGS. 13A and 13D are graphs of a first group illustrating the RACH sub-channels included in the each RACH code channel and access slots corresponding to them which are defined differently in accordance with the all RACH code channels in accordance with the present invention.

FIGS. 14A and 14D are graphs of a second group illustrating the RACH sub-channels included in the each RACH code channel and access slots corresponding to them which are defined differently in accordance with the all RACH code channels in accordance with the present invention.

As depicted in FIGS. 12~14D, the RACH code channels (code-channel#0~code-channel#15) are in an one-to-one correspondence relation with the PRACH preamble scrambling codes (SC#0~SC#15).

Accordingly, when the terminal transmits the RACH through the PRACH, after the ASC is set in the superior layer, a layer 1 (physical layer) selects randomly one signature and one access slot among the signatures and access slots included in the given ASC. After that, the layer 1 transmits the AP in accordance with a determined procedure. Herein, the AP uses a PRACH preamble scrambling code determined by the selected signature and access slot. In other words, when the selected slot is the access slot included in the code channel (code-channel#m), the pertinent AP uses the PRACH preamble scrambling code (SC#m) which is in the one-to-one correspondence relation with the code channel (code-channel#m).

When the AP is transmitted to the base station through the above-mentioned procedure, the base station decodes the kinds of the signature and PRACH preamble scrambling code used in the received AP, and informs to the terminal through AICH#m whether the AP is used.

When the terminal approves the transmitted AP, the terminal transmits a message part by using a channelizing code determined by the approved signature and PRACH message part scrambling code in the one-to-one correspondence relation with the approved PRACH preamble scrambling code.

Accordingly, the total 16 (=$X_{reuse\text{—}max}$) PRACH message part scrambling codes exist per one cell.

The base station informs to the terminal whether it approves the AP transmitted from the terminal in accordance with the above-described procedure.

When it is x=1, because the base station only has to inform the approval of the signature transmitted by the terminal to the terminal, it uses the conventional AICH.

When it is x≧2, the base station has to inform not only the approval of the signature transmitted by the terminal, but also information about reuse (namely, approval of the used PRACH preamble scrambling code) of the signature to the terminal, it uses the R (=x)-number of AICH. For example, when the at least two terminals transmit the AP to the base station for the RACH transmission, the base station informs the approval about the AP which uses the different PRACH preamble scrambling code to the terminal by using the each independent AICH. In other words, the base station informs the approval about the AP which uses the PRACH preamble scrambling code (SC#m) to the terminal through the AICH#m. Herein, the each AICH#m uses the same down link scrambling code and different OVSF code each other, a SF of the all AICH#m can be designed as same for the sake of convenience (namely, $C_{ch,SFm,Km}=C_{ch,SF,Km}$).

Figure 15:
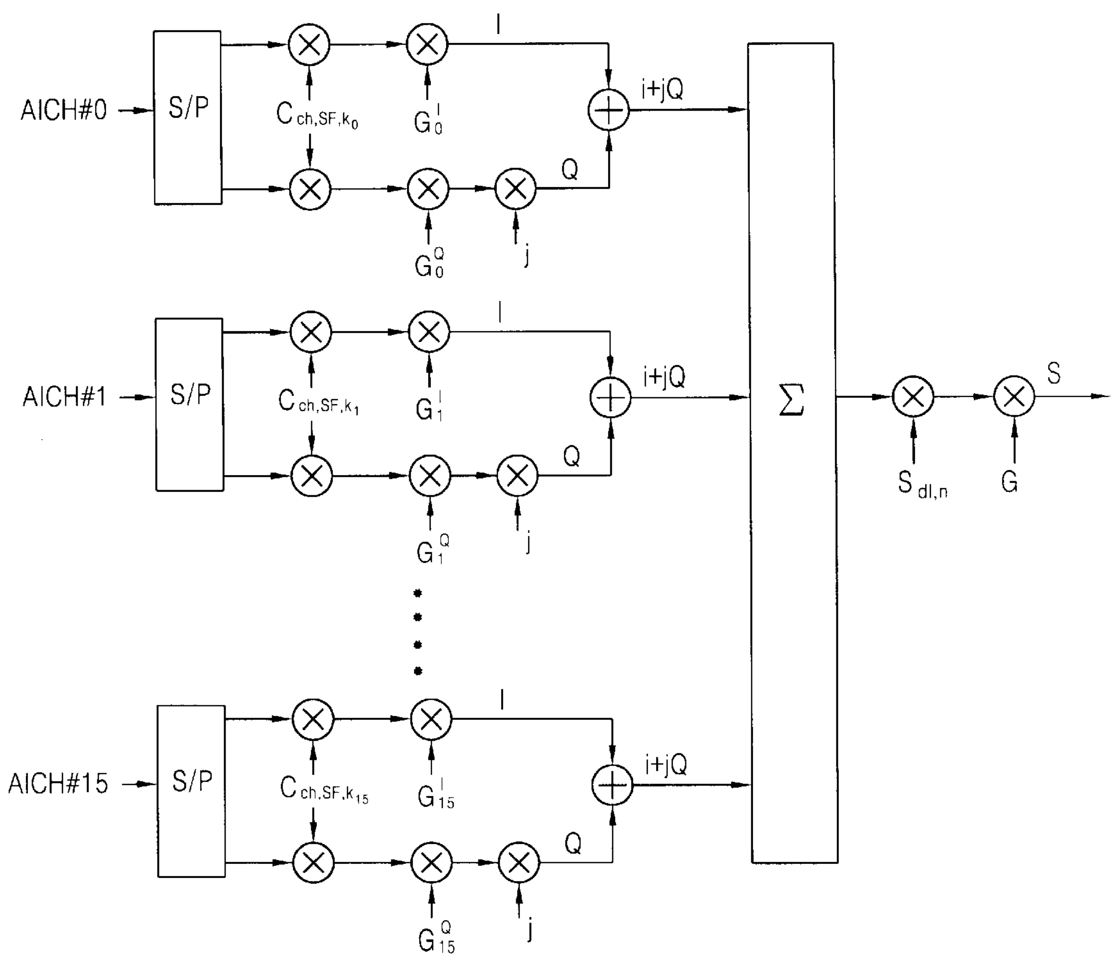
FIG. 15 illustrates a construction of a system for transmitting an AICH#m in accordance with the present invention.

FIG. 15 is a block diagram illustrating a system transmitting the AICH#m from the base station to the terminal in accordance with the present invention. It comprises serial/parallel converters (S/P) for converting the AICH#0~AICH#15 respectively, a plurality of multipliers, and a plurality of adders in order to inform the approval about the 16 AP transmitted from the terminal. The operation of the system will now be described.

The channel code ($C_{ch,SFm,Km}$) is multiplied to the signals converted with the serial/parallel converters, after that a weight value $\{G_m^I, G_m^Q\}$ for adjusting a transmission power ratio is multiplied to the signals, and the signals are converted into complex signal sequences. The complex signal sequences are added through the adder, the same down link scrambling code ($S_{dl,n}$) and a gain (G) adjusting the transmission power ratio of the coded signal are multiplied to the complex signal sequences, and they are transmitted to the terminals.

Herein, the relation between the Km and AICH#m in the channel code ($C_{ch,SFm,Km}$) can be set optionally.

Figure 16:
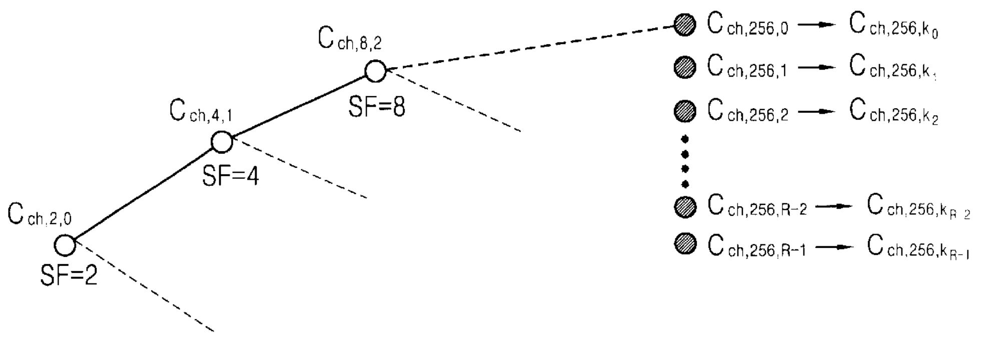
FIGS. 16 and 17 illustrate an OVSF code tree for the AICH#m in accordance with the present invention.
Figure 17:
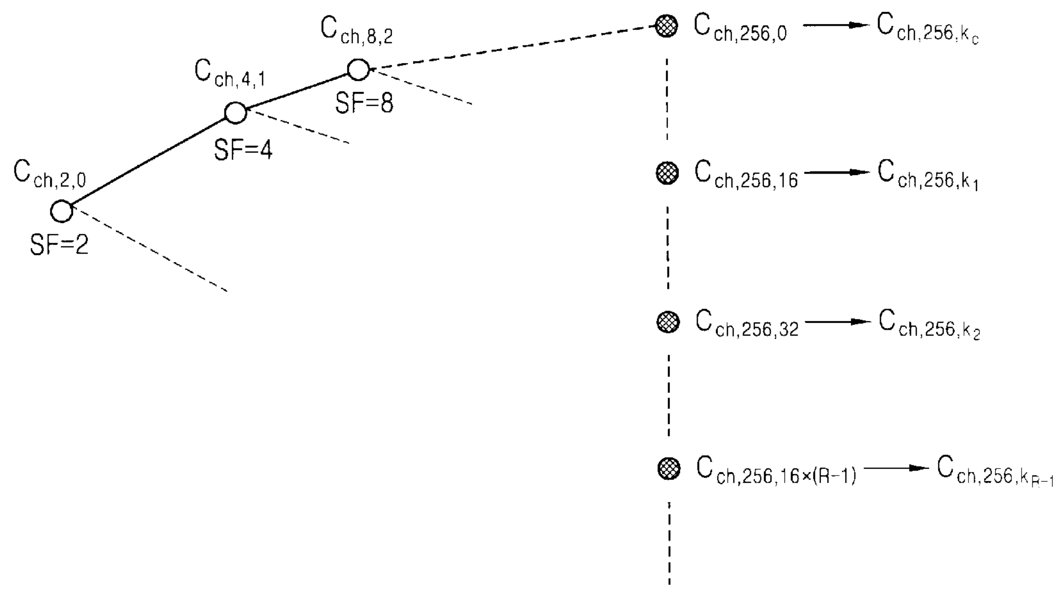

FIGS. 16 and 17 illustrate code trees of the OVSF code allocation method for the AICH#m transmitted from the base station to the terminal in accordance with the present invention, it describes the code tree spreading the SF from 2 to 256.

Accordingly, the base station transmits the channel code when the SF is 256.

Figure 18:
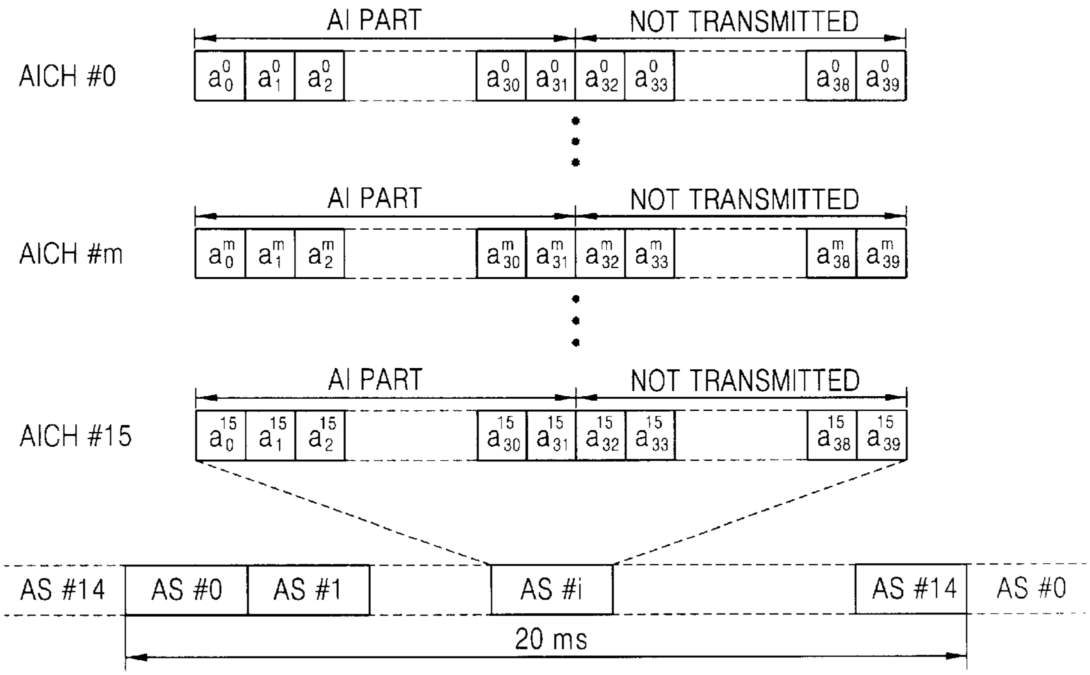
FIG. 18 illustrates a structure of the AICH#m in accordance with the present invention.

FIG. 18 illustrates an AICH structure in accordance with the present invention.

The structure of the AICH#m can be set optionally, in the present invention it is R=16 and SF=256. The AICH#m in accordance with the present invention includes 16 AICH (AICH#0, AICH#1, . . . , AICH#15), the each AICH is constructed with 15 AS (Access Slot; AS#0, AS#1, . . . , AS#15), the length of the one AS is 40 bit. The AS is divided into a 32 bit AI (Acquisition Indicator) part and a 8 bit (a32, a33, . . . , a39) non-transmission part. The AI is the bit allotted for informing the usability of the signature transmitted from the terminal. Accordingly, the usability of the signature used in the access preamble is judged by decoding the bit of the AI part by the terminal.

The ($a_0^m$, $a_1^m$, $a_2^m$, . . . $a_{31}^m$) included in the AI can be described as below Equation 7:

$$a_j^m = \sum_{s=0}^{15} AI_s^m b_{s,j} \tag{7}$$

Herein, $AI_s^m$ describes the AI (Acquisition Indicator) about the signature AP#s transmitted along with the AP by the terminal, it has a value among {+1, −1, 0}. In addition, $b_{sj}$ can be defined as FIG. 19.

Figures 19, 20:
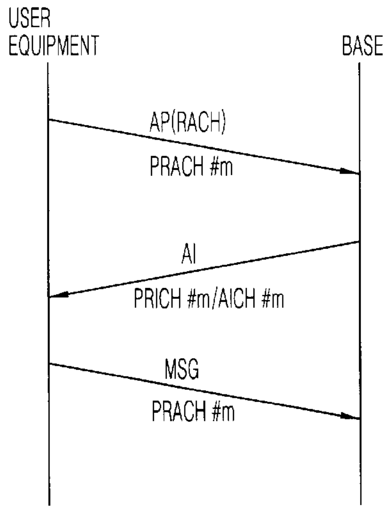
FIG. 19 is a table showing a signature pattern in use for the AICH#m in accordance with the present invention.
FIG. 20 illustrates a communication procedure of a mobile communication system in accordance with the present invention.

FIG. 20 is a flow chart illustrating a communication procedure of a mobile communication system in accordance with the present invention.

When it is x=1, because the base station only has to inform the approval of the signature transmitted from the terminal to the terminal, the base station uses the conventional AICH.

When it is x≧2, the base station has to inform not only the approval of the signature transmitted by the terminal, but also information about reuse (namely, approval of the used PRACH preamble scrambling code) of the signature to the terminal. For that, a new sub-channel such as the RRICH can be used. For example, when at least two terminals transmit the access preambles for the RACH transmission, the used signatures are same, however the different access preambles (or, used signature are different, but the access preambles using the same PRACH preamble scrambling code) can exist in the used PRACH preamble scrambling codes. Herein the base station judges whether the signature is approved on the basis of the conventional AICH, and judges whether the PRACH preamble scrambling code is approved on the basis of the RRICH.

Figure 21:
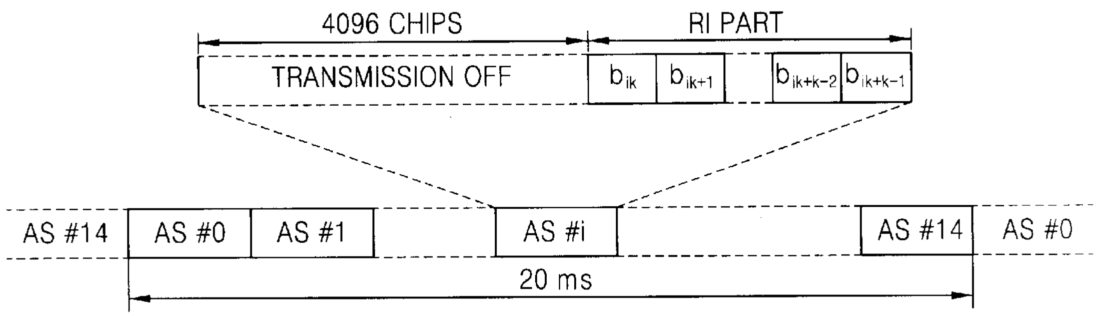
FIGS. 21 and 22 illustrate structure of an RRICH#m in accordance with the present invention.
Figure 22:
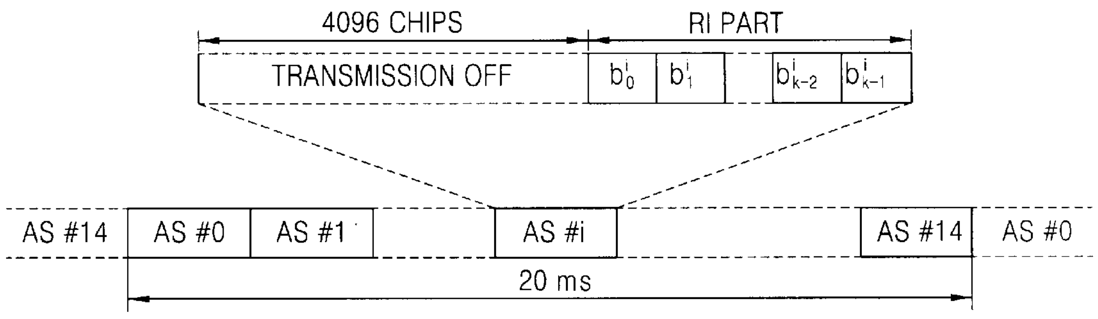

FIGS. 21 and 22 illustrate a physical structure of the RRICH.

A scrambling code for down link and a channel section code for the RRICH (R-Reuse Indicator Channel) can be set optionally, when the scrambling code for down link and channel section code used in the conventional AICH are used, the complexity of a hardware can be minimized. For example, when the scrambling code for down link and channel section code of the AICH and RRICH are same, the SF of the RRICH is 256 and k is 8 in FIGS. 21 and 22.

In order to transmit more information, the SF increases or the transmission time of the AICH decreases (namely, decreasing the number of transmission bits of the RRICH)

on the behalf of altering the SF, and the transmission time of the RRICH increases (namely, increasing the number of transmission bits of the RRICH).

FIG. 21 illustrates the RRICH when the base station transmits the information to the terminal by one frame unit including the approval of the PRACH preamble scrambling code in accordance with the present invention. The each RRICH is constructed with 15 AS (Access Slots AS#0, AS#1, . . . , AS#15), the length of the one AS is 20 ms. The one AS is divided into a transmission off part constructed with a 4096 chip and a RI part ($b_{ik}, b_{ik+1}, b_{ik+2}, \ldots, b_{ik+k-1}$).

The terminal confirms the approval by decoding the RI part ($b_{ik}, b_{ik+1}, b_{ik+2}, \ldots, b_{ik+k-1}$) of the RRICH, for example, bits of $\{b_0, b_1, \ldots, b_{118}, b_{119}\}_{k=s}$. A in the AICH of the 3GPP can be used as a method which generates an approval signal by using the each bit.

FIG. 22 describes the RRICH structure when the base station transmits the information to the terminal by each access slot unit including the approval of the PRACH preamble scrambling code in accordance with the present invention. The each RRICH is constructed with 15 AS (Access Slots; AS#0, AS#1, . . . , AS#15), the length of the one AS is 20 ms. The one AS is divided into a transmission off part constructed with a 4096 chip and a RI part ($b^i_0, b^i_1, b^i_2, \ldots, b^i_{k-1}$).

The terminal confirms the approval by decoding the RI part ($b_{ik}, b_{ik+1}, b_{ik+2}, \ldots, b_{ik+k-1}$) of the RRICH, for example, bits of $\{b^i_0, b^i_1, b^i_2, \ldots, b^i_7\}_{k=s}$. In this case, the correlation between the RRICH and AICH can be defined many ways as occasion demands.

When, the base station uses the RRICH for informing the approval of the PRACH preamble scrambling code, the $\{b^i_0, b^i_1, \ldots, b^i_7\}$ included in the AS#i on the RICH can be related mutually with the AI part transmitted to the AICH of the 4096 chip region which is off for transmission period of the AS#i. In other words, in order to confirm the approval of the signature used by the terminal and PRACH preamble scrambling code, when the access slot allotted to the terminal is AS#i, the approval can be known by decoding the AICH and RRICH corresponding to the AS#i. Herein, when the approval is confirmed in the AICH and RRICH at the same time, the terminal transmits a RACH message part.

Meanwhile, when the terminal uses the RRICH for informing the approval of the PRACH preamble scrambling code, there can be several cases in a mapping relation between the bits used in the $\{b^i_0, b^i_1, \ldots, b^i_7\}$ of the RRICH and the RI (Reuse Indicator).

FIGS. 23~25 are tables illustrating the mapping relation between the bits used in the $\{b^i_0, b^i_1, \ldots, b^i_7\}$ of the RRICH and the RI (Reuse Indicator).

Herein, m means a mth RI-signature pattern ($RI_{signature\#m}$) the $RI_{signature\#}$m is related to the approval of the PRACH preamble scrambling code SC#m, it can be described as below Equation 8:

$$b^i_k = \sum_{m=0}^{15} RI_m c_k \quad (\ )$$

Herein, $RI_m$ describes the approval about the PRACH preamble scrambling code SC#m, it has a value among {+1, −1, 0}.

When it is x<9 in FIGS. 23 and 25, the ASC can be designated optionally, but when it is x>8, it has to be limited. When it is x>8 in FIG. 15, the ASC can be designated optionally.

Meanwhile, in the first embodiment and second embodiment in accordance with the present invention, a processing procedure for informing the approval about the access preamble transmitted from the terminal through the AICH by the base station is different each other. Herein, the structure of the AICH is divided into a case in x=1 and a case in x>1.

When it is x=1, because the base station only has to inform the approval of the signature transmitted from the terminal, the base station uses the conventional AICH.

($a_0, a_1, a_2, \ldots, a_{31}$) included in the AI can be described as below Equation 9.

$$a_j = \sum_{s=0}^{15} AI_s b_{s,j} \quad (9)$$

Herein, AIs describes the AI about the signature (AP#s) transmitted along with the AP from the terminal, and it has a value among {+1,−1,0}.

In addition, $b_{sj}$ can be defined as FIG. 26.

When it is x>1, the base station has to inform not only the approval of the signature transmitted by the terminal, but also the approval of the PRACH preamble scrambling code. For that, the AICH structure is depicted in FIG. 27.

Figures 27, 28:
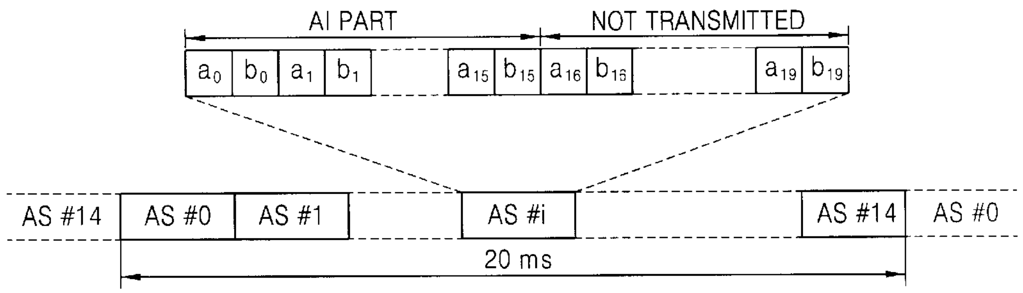
FIG. 27 illustrates a structure of the AICH in accordance with the present invention.
FIG. 28 is a table showing a signature pattern for an AI and an RI portion of the AICH in accordance with the present invention.

FIG. 27 illustrates the structure of the AICH when the base station informs the approval of the PRACH preamble scrambling code to the terminal.

The each AICH is constructed with 15 AS (Access Slots; AS#0, AS#1, . . . , AS#15), the length is 20 ms. The one AS is divided into a 32 bit AI and RI part, and a 8 bit non-transmission part.

Herein, $\{a_0, a_1, \ldots, a_{15}\}$ of the AI and RI part are the AI part describing the approval of the used signature AP#s, and $\{b_0, b_1, \ldots, b_{15}\}$ is the RI part describing the approval of the used PRACH preamble scrambling code SC#m.

Herein, the $\{a_0, a_1, \ldots, a_{15}\}$ depicting the AI part can be described as below Equation 10:

$$a_j = \sum_{s=0}^{15} AI_s c_{s,j} \quad (10)$$

Herein, AIs describes the AI about the used signature AP#s, it has a value among +1, −1, 0. In addition, $C_{sj}$ can be defined as FIG. 28.

The bits $\{b_0, b_1, \ldots b_{15}\}$ depicting the RI part can be described as below Equation 11:

$$b_j = \sum_{m=0}^{15} RI_m c_{m,j} \quad (11)$$

Herein, the $RI_m$ describes the approval about the used PRACH preamble scrambling code SC#m, it has a value among +1, −1, 0. In addition, $C_{mj}$ can be defined as FIG. 28.

A physical allocation method about a CPCH (Common Packet Channel) as the another random access channel of the 3GPP system in accordance with the present invention will now be described by adapting the above-described RACH and AICH channel allocation methods as it is. In other words, when the RACH in accordance with the embodiment of the present invention is adapted to the CPCH, the AICH corresponds to an AP-AICH and a CD-AICH. It will now be described in detail.

Figure 29:
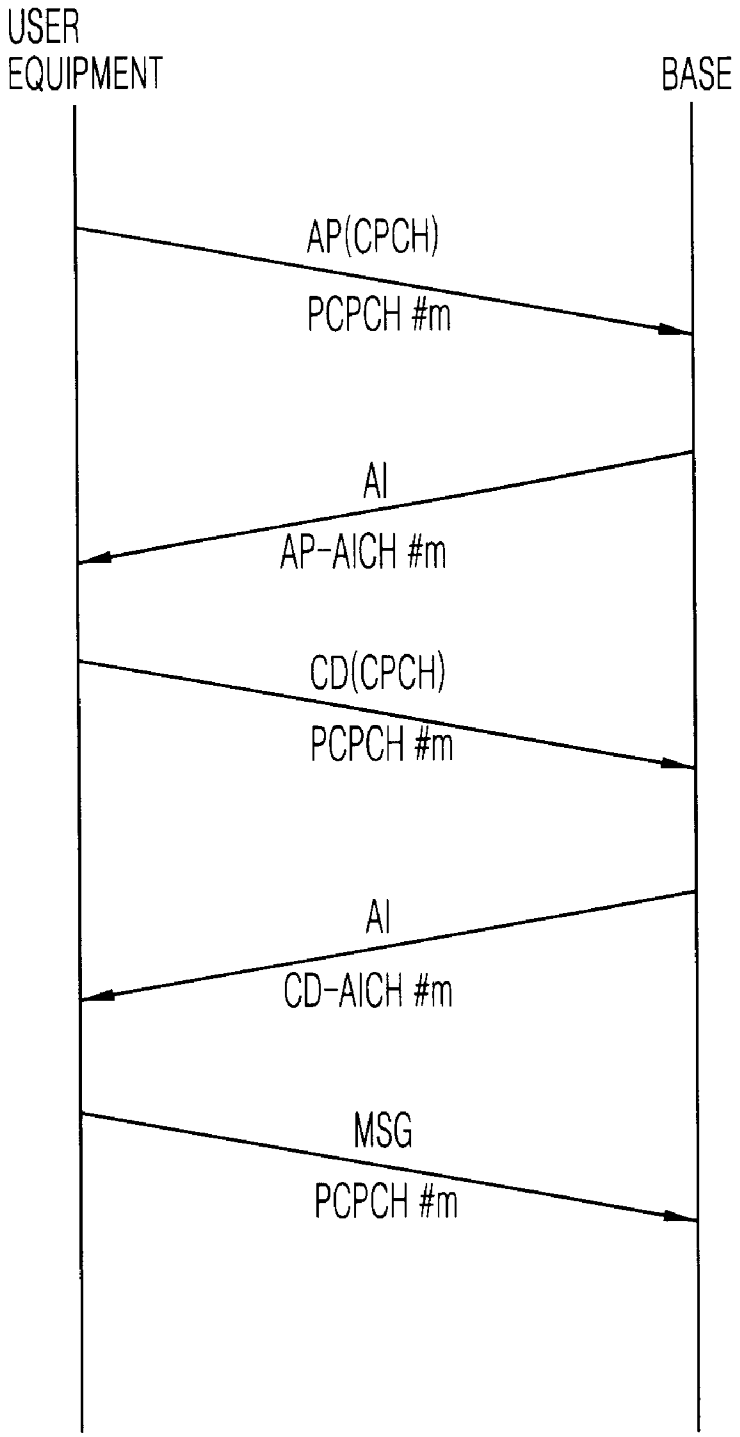
FIG. 29 shows a communication procedure of the mobile communication system in accordance with the present invention.

FIG. 29 is a flow chart illustrating a communication procedure of a mobile communication system in accordance with the present invention.

For the PCPCH transmission, when the terminal allocates 16 signatures AP#s (#s=0, 1, . . . , 15) and a x-number of PCPCH scrambling codes per one cell, the x-number of PCPCH scrambling codes is classified into a y-number of CPCH code channels. The all PCPCH scrambling codes included in the each CPCH code channel are used for making the PCPCH message part scrambling code, the two PCPCH scrambling codes selected among them are used for making a PCPCH access preamble scrambling code and a PCPCH CD access scrambling code. For example, when x is 64, total four CPCH code channels occur, the each CPCH code channel has the 16 PCPCH scrambling codes. In other words, the total 64 (=x) PCPCH scrambling codes ($C_{long,l,n}$ (i)) are long codes having a real number value such as a Gold sequence. Herein, i describes an ith bit among the whole bits constructing the code, n is an integer having a range of {0, 1, . . . , 63} for the sake of convenience.

The $C_{long,l,n}$(i) is classified into four (=y) CPCH code channels as below.

$$\text{Code-channel \#0: } C_{long,l,n}(i),\ n=0, 1, 2, \ldots, 15 \quad (12)$$

$$\text{Code-channel \#1: } C_{long,l,n}(i),\ n=16, 17, \ldots, 31 \quad (13)$$

$$\text{Code-channel \#2: } C_{long,l,n}(i),\ n=32, 33, \ldots, 47 \quad (14)$$

$$\text{Code-channel \#3: } C_{long,l,n}(i),\ n=48, 49, \ldots, 63 \quad (15)$$

The terminal uses $C_{long,l,n}$(i), it generates the 64 PCPCH message part scrambling codes (MSC#n, n=0, 1, . . . , 63) per one cell. Accordingly, the MSC#n can be defined as below Equation 16 and 17:

$$MSC\#n=C_{long,n}(i+8192),\ i=0, 1, 2, \ldots, 38399 \quad (16)$$

$$MSC\#n=C_{long,n}(i+4096),\ i=0, 1, 2, \ldots, 38399 \quad (17)$$

The $C_{long,n}$(i) of Equation 16 and 17 is the long code having a complex number value made by using the $C_{long,n}$ (i).

Meanwhile, the PCPCH message part scrambling code MSC#n can be generated as below Equation 18 by using a short code $C_{short,l,n}$(i) having a certain complex number value.

$$MSC\#n=C_{short,n}(i),\ i=0, 1, 2, \ldots, 38399 \quad (18)$$

When the terminal uses the $C_{short,n}$ (i), the four (=y) PCPCH access preamble scrambling codes (APSC#m, m=0, 1, 2, 3) and the four (=y) PCPCH CD access preamble codes (CD-APSC#m, m=0, 1, 2, 3) per one sell can be defined as below Equation 19 and 20.

$$APSC\#m=C_{long,l,n}(i),\ i=0, 1, 2, \ldots, 4095 \quad (19)$$

$$CD\text{-}APSC\#m=C_{long,l,n}(i),\ i=0, 1, 2, \ldots, 4095 \quad (20)$$

The relation between the n and m in Equation 19 and 20 can be determined optionally, but the APSC#m and CD-APSC#m have to be defined by the different $C_{long,l,n}$ (i).

In order to simplify the description of the present invention, Equation 19 and 20 are replaced by Equation 21 and 22.

$$APSC\#m=C_{long,\,1,\,16\times m}(i),\ i=0, 1, 2, \ldots, 4095 \quad (21)$$

$$CD\text{-}APSC\#m=C_{long,\,1,\,16\times m+1}(i)>i=0, 1, 2, \ldots, 4095 \quad (22)$$

Herein, the APSC#m (m=0, 1, 2, 3) and CD-APSC#m (m=0, 1, 2, 3) are in the one-to-one correspondence relation with the each Code-channel#m (m=0, 1, 2, 3) respectively.

It is assumed the APSC#m corresponds to the Code-channel#m. In other words, when the terminal receives an approval reply from the base station by using the APSC#m, the PCPCH message part scrambling code for transmitting the CPCH message part transmits the MSC#n included in code-channel#m to the base station. Herein, the codes included in the each CPCH code channel can be defined as below Equation 23~26.

$$\text{Code-channel \#0: } APSC\#0,\ CD\text{-}APSC\#0,\ MSC\#n,\ C_{long,l,n}(i) \quad (23)$$

n=0, 1, 2, . . . , 15

$$\text{Code-channel \#1: } APSC\#1,\ CD\text{-}APSC\#1,\ MSC\#n,\ C_{long,l,n}(i) \quad (24)$$

n=16, 17, . . . , 31

$$\text{Code-channel \#2: } APSC\#2,\ CD\text{-}APSC\#2,\ MSC\#n,\ C_{long,l,n}(i) \quad (25)$$

n=32, 33, . . . , 47

$$\text{Code-channel \#3: } APSC\#3,\ CD\text{-}APSC\#3,\ MSC\#n,\ C_{long,l,n}(i) \quad (26)$$

n=48, 49, . . . , 63

The user terminal or UE (User Equipment) generates the AP through below process and transmits it to the base station.

The terminal transmits the AP to the base station by using the preamble signature (Csig,s) generated by using the one signature among the 16 signatures AP#s(s=0, 1, 2, . . . , 15) and the one APSC#m among the x-number of APSC#m(m=0, 1, . . . , x) permitted to the pertinent cell. Herein, the x is a number describing the reuse factor of the pertinent cell, it can be determined in system design, and its range is ≦x≦X (maximum value).

When it is x=1, it is the conventional system which does not consider the reuse factor.

When it is x=X, it describes a case which uses the all PCPCH scrambling codes allotted to the each cell, it is a ystem considering the reuse factor to the utmost. For example, when the X is 4, the range of the x is 1≦x≦4.

When the terminal generates the AP and CD in order to transmit the CPCH through the PCPCH, actual usable AP#s, APSC#m, CD-APSC#m can be limited whenever the each CPCH is transmitted. Accordingly, before the CPCH access procedure for CPCH transmission starts, the terminal has to inform the items such as the usable AP#s, APSC#m, CD-APSC#m, CPCH sub-channel group, MSC#n etc. to the superior layer of the protocol.

Herein, for the pertinent CPCH transmission, the ASC (Access Service Class) concept given by the superior layer can be adapted. In other words, before the CPCH access procedure for the CPCH transmission starts, the terminal has to inform the items such as the usable signatures, CPCH code channel group, CPCH sub-channel group about the each CPCH code channel in the CPCH code channel group etc. defined in accordance with the each SC to the superior layer of the protocol. Herein, the CPCH code channel group means a set consisted with several channels among the total four (=$X_{reuse\text{—}max}$) CPCH code channels, the CPCH sub-channel group means a set consisted with several CPCH sub-channels among the total CPCH sub-channels.

The each CPCH code channel grasps the definition information about the sub-channels included in itself. In other words, the four CPCH code channels separately have the CPCH sub-channels included in itself and definition information about the access slot corresponding to it. The definitions about the CPCH sub-channels included in the CPCH code channel and access slot corresponding to it can be the same or different in accordance with the CPCH.

The definitions about the CPCH sub-channels included in the CPCH code channel and access slot corresponding to it can be constructed as same about the all CPCH code channels as depicted in FIG. 12.

In addition, The definitions about the CPCH sub-channels included in the CPCH code channel and access slot corresponding to it can be constructed differently about the CPCH code channel as depicted in FIG. 13A and 14A.

For example, when the terminal transmits the CPCH to the base station through the PCPCH, after the terminal designates the usable codes and signatures in the superior layer for the pertinent CPCH transmission, the layer 1 (physical layer) selects randomly one signature and one access slot among the usable (or included in the given ASC) signatures and access slots. After that, the layer 1 transmits the AP in accordance with a determined procedure. Herein, the AP uses a PRACH preamble scrambling code determined by the selected signature and access slot. In other words, when the selected slot is the access slot included in the code channel (code-channel#m), the pertinent AP uses APSC#m included in the Code-channel#m.

The base station decodes the kinds of the signature AP#s and APSC#m used in the received AP, and informs to the terminal through the AP-AICH whether the signature AP#s and APSC#s are usable.

When the approval signal from the base station is checked in the AP-AICH, the terminal transmits a CD in order to judge whether a collision occurs. Herein, the CD randomly selects one signature and one access slot among the usable (or included in the given ASC) signatures and access slots, the select method is similar to the AP select and transmission method.

There can be two examples in a method for informing the information about the collision from the base station receiving the CD to the terminal through the AICH as below.

EXAMPLE 1

The AP-AICH and CD-AICH use the same down link scrambling in common, the all kinds of AICH use the different OVSF codes each other as a channelizing code. In other words, the AP-AICH#m and channelizing code $C^{AP}_{ch,SF,Km}$ of the AP-AICH#m are in the one-to-one correspondence relation, and the CD-AICH#m and $C^{CD}_{ch,SF,Km}$ of the CD-AICH#m are in the one-to-one correspondence relation. Herein, the certain $C^{AP}_{ch,SF,Km}$, $C^{CD}_{ch,SF,Km}$ are different each other.

EXAMPLE 2

The AP-AICH use the same down link scrambling code in common, the CD-AICH also can use the same down link scrambling code in common. However, in Example 2, the down link scrambling code used by the AP-AICH and the down link scrambling code used by the CD-AICH have to be different, the all AP-AICH have to use different OVSF code each other as a channelizing code, and the all CD-AICH also use different OVSF code each other as a channelizing code. In other words, the AP-AICH#m and channelizing code $C^{AP}_{ch,SF,Km}$ of the AP-AICH#m are in the one-to-one correspondence relation, and the CD-AICH#m and $C^{CD}_{ch,SF,Km}$ of the CD-AICH#m are in the one-to-one correspondence relation. Herein, the certain $C^{AP}_{ch,SF,Km}$, $C^{CD}_{ch,SF,Km}$ can be different or can be same.

As described in Example 1, in the AP-AICH and CD-AICH, a method using the same scrambling code and different kind of channelizing code will now be described as below.

When the all transmitted AP and CD are approved, the terminal determines the PCPCH message part scrambling code (MSC#n) by using a below Equation 27 with the channelizing code and the signature AP#s and APSC#m approved by the AP.

$$MSC\#n|_{n=16\times m+s} \tag{27}$$

When the terminal transmits the AP and CD through the above-described process, the base station informs the approval of the AP and CD through the AP-AICH and CD-AICH respectively.

When it is x=1, because the base station only has to inform the approval of the signature transmitted from the terminal, it can use the conventional AP-AICH and CD-AICH.

When the x is not less than 2, the base station informs not only the approval of the signature but also information about the reuse of the signature (namely, the approval of the used PCPCH scrambling code) as below two Examples.

EXAMPLES 1

Transmission of the AP-AICH Using the R (=x)-Number

When at least two terminals transmit the AP for the CPCH transmission, is the approval about the AP using the different PCPCH access preamble scrambling code each other is informed by using the independence AP-AICH. In other words, the approval about the AP using the PCPCH access preamble scrambling code APSC#s is informed through the AP-AICH#m.

EXAMPLE 2

Transmission of the CD-AICH Using a R (=x)-Number

When the at least two terminals transmit the CD for the CPCH transmission, the approval about the CD using the different PCPCH CD access preamble scrambling codes is informed by using the independent CD-AICH. In other words, the approval about the CD using the PCPCH CD access preamble scrambling code CD-APSC#s is informed through the CD-AICH#m.

When it is assumed the each AICH uses the same down link scrambling code and different OVSF code, the SF of the all AICH is $C^{AP}_{ch,SFm,km}=C^{AP}_{ch,SFm,km}$, and $C^{CD}_{ch,SFm,km}=C^{CD}_{ch,SFm,km}$.

In the present invention, a case in R=4, $C^{AP}_{ch,SFm,km}=C^{AP}_{ch,SFm,km}$, and $C^{CD}_{ch,SFm,km}=C^{CD}_{ch,SFm,km}$.

Figure 30:
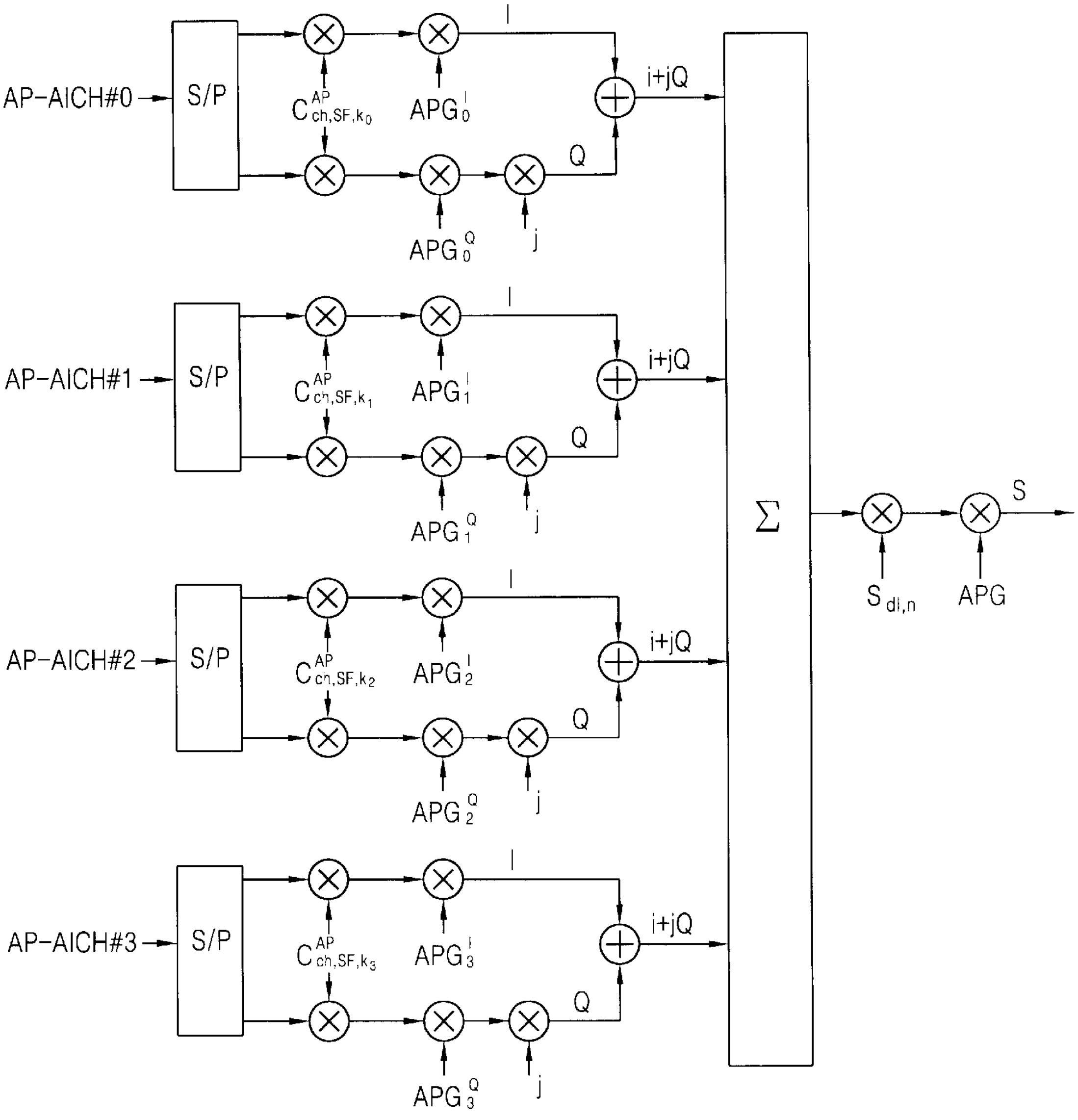
FIG. 30 illustrates a system for transmitting an AP-AICH#m in accordance with the present invention.

FIG. 30 is a block diagram illustrating a system for transmitting four AP-AICH by the base station.

It comprises serial/parallel converters (S/P) for converting the AP-AICH#(m=0, 1, 2, 3,) respectively, a plurality of multipliers, and a plurality of adders in order to inform the approval about the four AP transmitted from the terminal. The operation of the system will now be described.

The signals converted by the serial/parallel converters are converted into a complex signal sequence after multiplying a channel code ($C^{CD}_{Ch,SF,km}$) and a weight value $\{CDG_m^I, CDG_m^Q\}$ adjusting the transmission power ratio. The complex signal sequences are added through the adder, and are transmitted to the terminals after multiplying the same down link scrambling code ($S_{dl,n}$) and a gain (APG) adjusting the transmission power ratio of the coded signal.

The relation between the km of the $C^{AP}_{ch,Sfm,km}$ and AP-AICH#m can be set optionally.

Figure 31:
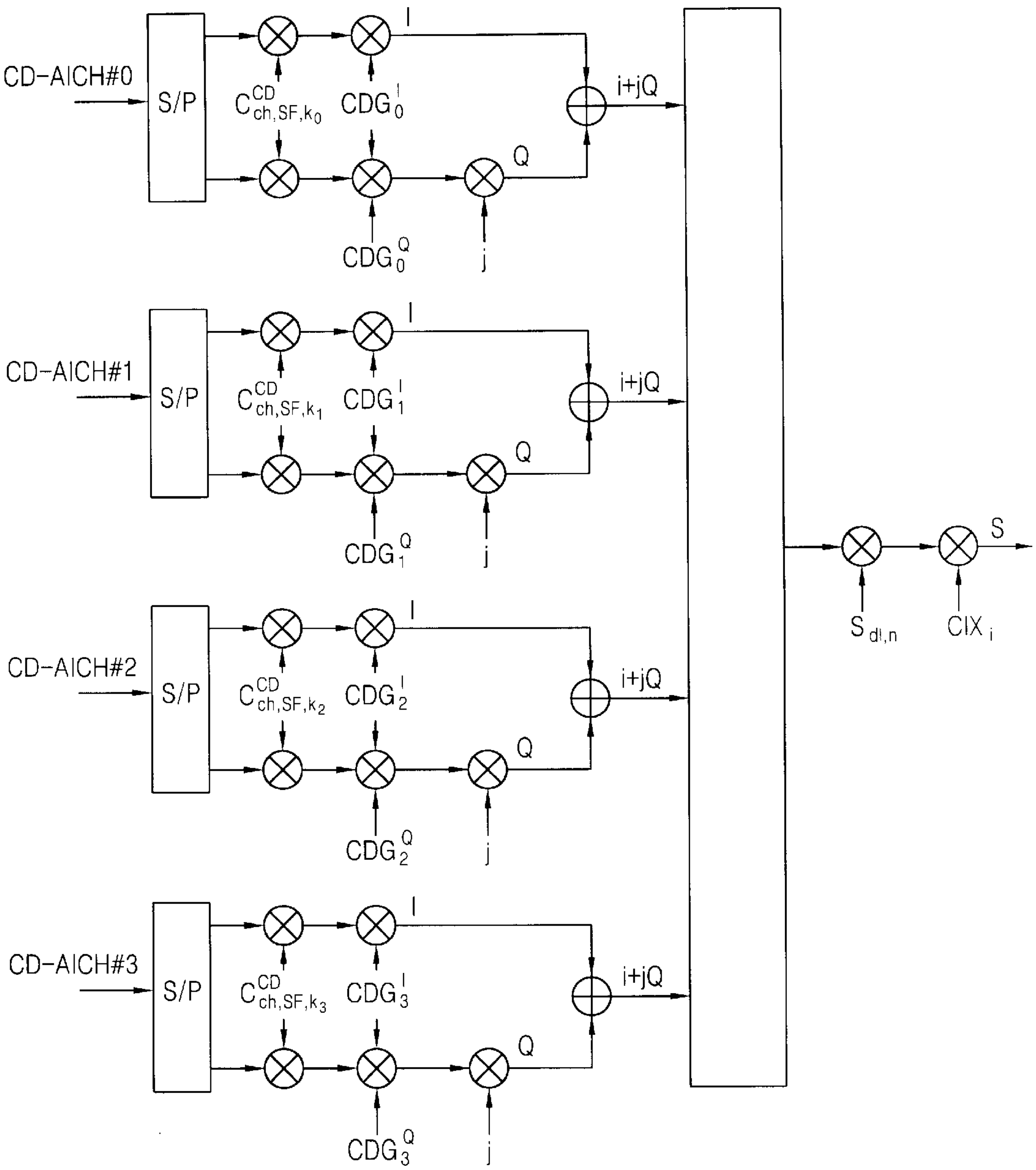
FIG. 31 illustrates a system for transmitting an CD-AICH#m in accordance with the present invention.

FIG. 31 is a block diagram illustrating a system for transmitting the four (=R) CD-AICH by the base station.

It comprises serial/parallel converters (S/P) for converting the CD-AICH#(m=0, 1, 2, 3,) respectively, a plurality of multipliers, and a plurality of adders in order to inform the approval about the four CD transmitted from the terminal. The operation of the system will now be described.

The signals converted by the serial/parallel converters are converted into a complex signal sequence after multiplying the channel code ($C^{CD}_{ch,SF,km}$) and weight value $\{CDG_m^I, CDG_m^Q\}$ adjusting the transmission power ratio. The complex signal sequences are added through the adder, and are transmitted to the terminals after multiplying the same down link scrambling code ($S_{dl,n}$) and a gain (CDG) adjusting the transmission power ratio of the coded signal.

The relation between the km of the $C^{CD}_{ch,SFm,km}$ and CD-AICH#m can be set optionally.

Figure 32:
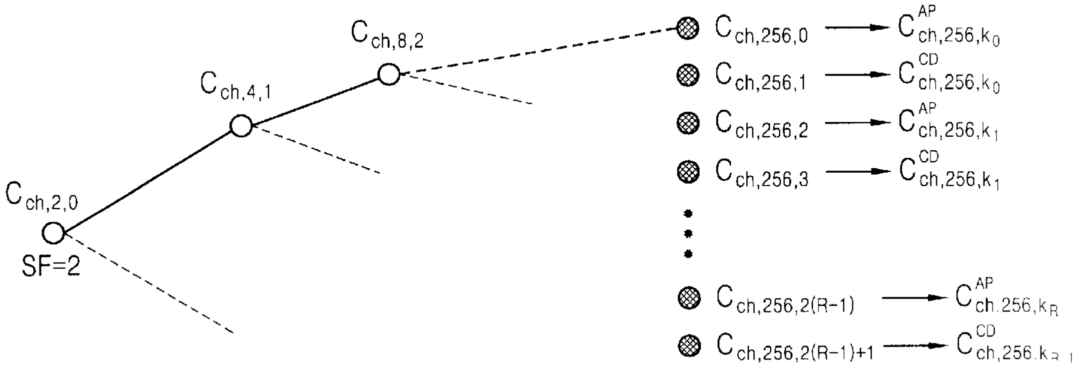
FIGS. 32 and 33 illustrates a tree structure for explaining an OVSF code allocation method for the AP-AICH#m and the CD-AICH#m in accordance with the present invention.
Figure 33:
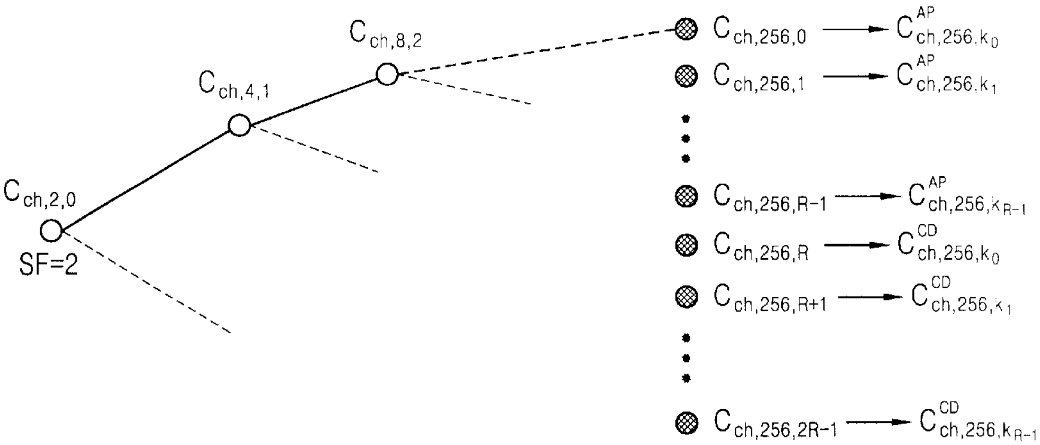

FIGS. 32 and 33 illustrate a code tree of an OVSF code allocation method for the AP-AICH# and CD-AICH# transmitted from the base station to the terminal, it describes the code tree spreading the SF from 2 to 256.

Figure 34:
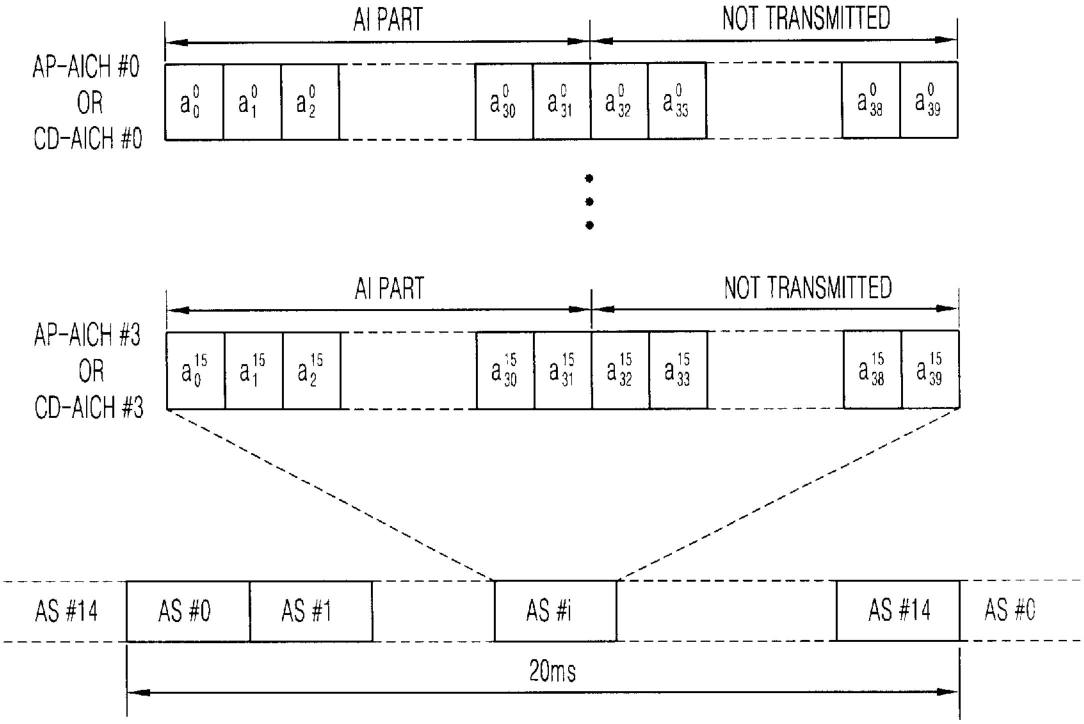
FIG. 34 illustrates structures of the AP-AICH#m and the CD-AICH#m in accordance with the present invention.

FIG. 34 illustrates the AICH structure in accordance with the present invention when the AP-AICH#0-AP-AICH#3 are same or CD-AICH#0~CD-AICH#3 are same, it is R=4, and it is SF=256.

AS depicted in FIG. 34, the AP-AICH#m or CD-AICH#m includes the four AP-AICH (AP-AICH#0~AP-AICH#3) or CD-AICH (CD-AICH#0~CD-AICH#3), the each AP-AICH#m or CD-AICH#m is constructed with 15 AS (Access Slot; AS#0, AS#1, . . . , AS#15), the length is about 20 ms, and the length of the one AS is 40 bit. The AS is divided into a 32 bit AI (Acquisition Indicator) part and a 8 bit (a32, a33, . . . a39) non-transmission part. The AI is the bit allotted for informing the usability of the signature transmitted form the terminal. Accordingly, the usability of the signature used in the access preamble is judged by decoding the bit of the AI part by the terminal.

The ($a_0^m$, $a_1^m$, $a_2^m$, . . . , $a_3^m$) can be described as below Equation 28:

$$a_j^m = \sum_{s=0}^{15} AI_s^m b_{s,j} \tag{28}$$

Herein, $AI_s^m$ describes the AI (Acquisition Indicator) about the signature AP#s used for the AP using the AP-APSC#m, it has a value among {+1, −1, 0}. In addition, in the CD-AICH#m, it describes the AI about the signature AP#s used for the CD using the CD-APSC#m.

Herein, $b_{sj}$ can be defined as a table depicted in FIG. 35.

Figures 36, 37, 38:
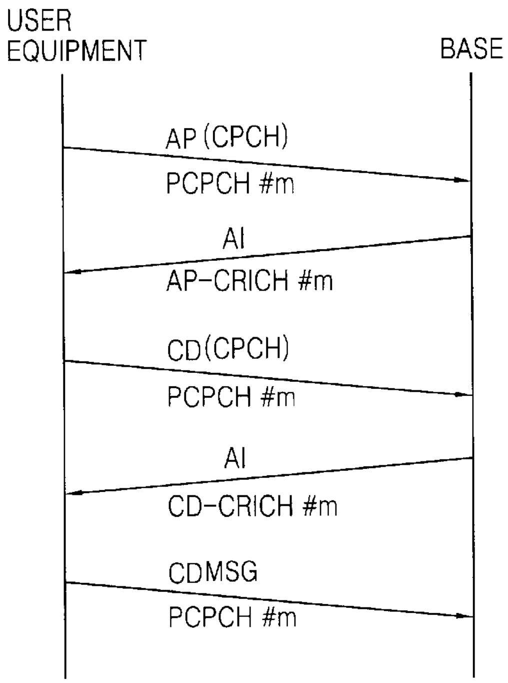
FIG. 36 illustrates a communication procedure of the mobile communication system in accordance with the present invention.
FIGS. 37 and 38 are table showing an RI signature pattern of a CRICH in accordance with the present invention.

FIG. 36 is a flow chart illustrating a communication procedure of a mobile communication system in accordance with the present invention.

It informs the approval of the AP and CD by using a sub-channel such as the CRICH.

When at least two terminals transmit the AP and CD for CPCH transmission, the approval about the signature is judged on the basis of the conventional AP-AICH and CD-AICH. In other words, the approval of the PCPCH preamble scrambling code (claim the PCPCH access preamble scrambling code and PCPCH CD access preamble scrambling code together) is judged on the basis of the AP-CRICH and CD-CRICH.

AS described above, the AP-CRICH and CD-CRICH correspond to the AP-AICH and CD-AICH.

The physical structure of the CRICH is described in FIGS. 21 and 22.

The scrambling code for down link and channel section code used for the each CRICH can be set optionally, when the scrambling code for down link and channel section code used in the conventional AP-AICH and CD-AICH are used for the AP-CRICH and CD-CRICH respectively, the complexity of a hardware can be minimized. In order to simplify the description of the present invention, it is assumed that the scrambling code for down link and channel section code of the AICH and CRICH are same, the SF of the CRICH is 256 and k is 8 as depicted in FIGS. 21 and 22.

In order to transmit more information, the SF increases or the transmission time of the AICH decreases (namely, decreasing the number of transmission bits of the AICH) on the behalf of altering the SF, and the transmission time of the CRICH increases (namely, increasing the number of transmission bits of the CRICH).

As depicted in FIG. 21, the CRICH can transmit the information including the approval of the PCPCH preamble scrambling code from the base station to the terminal by the one frame unit. Herein, the terminal can use the method used by the AICH in the 3GPP as a method generating the approval signal by using the $\{b^i_0, b^i_1, b^i_2, \ldots, b^i_{k-1}, \}=\{b^i_0, b^i_1, b^i_2, \ldots, b^i_7\}|_{k=8}$ bits.

In addition, as depicted in FIG. 22, the CRICH can transmit the information including the approval of the PCPCH preamble scrambling code from the base station to the terminal by the each access slot unit. In other words, the terminal decodes the information about the AS#i by using the $\{b^i_0, b^i_1, b^i_2, \ldots, b^i_k\}=\{b^i_0, b^i_1, b^i_2, \ldots, b^i_7\}|_{k=8}$ bits. In this case, the correlation between the CRICH and AICH can be defined by several methods as occasional demands. When the CRICH is used for informing the approval of the PCPCH preamble scrambling code, the $\{b^i_0, b^i_1, b^i_2, \ldots, b^i_7\}$ included in the AS#i on the CRICH can be corresponded to the AI part transmitted on the AICH for the 4096 chip off time in the transmission period of the AS#i mutually. In other words, when the signature used by the terminal and access slot allotted to the terminal for confirming the approval of the PCPCH preamble scrambling code are AS#i, it is possible to know whether the approval is performed by decoding the AICH and CRICH corresponding to the AS#i. Herein, when the approval is performed on the both AICH and CRICH at the same time, in order to transmit the CPCH message part from the terminal to the base station, the CPCH message part is transmitted by using the PCPCH message part scrambling code determined by the Equation 27.

In order to know the approval of the PCPCH preamble scrambling code, when the CRICH is used, there is several mapping relations between the bits used in the $\{b^i_0, b_1, \ldots, b^i_7\}$ of the CRICH and the RI (Reuse Indicator).

Herein, the m means the mth RI-signature pattern ($RI_{signature\#m}$), the $RI_{signature\#m}$ in means the approval of the PCPCH preamble scrambling code (namely, APSC#m and CD-APSC#m).

When FIG. 37 is used, the $b^i_k$ of the AICH can be described as below Equation 29.

$$b_k^i = \sum_{m=0}^{15} RI_m c_k \tag{29}$$

Herein, $RI_m$ describes the approval about the PCPCH preamble scrambling code (namely, APSC#m or CD-APSC#m), it has a value among {+1, −1,0}.

Meanwhile, as depicted in FIG. 38, $b^i_k$ of the AICH can mean approval by each part. In other words, approval of $RI_{signature}$ #0~$RI_{signature}$ #3 is informed sequentially in accordance with a value of $\{b^i_0, b^i_1\}$, $\{b^i_2, b^i_3\}$, $\{b^i_4, b^i_5\}$, $\{b^i_6, B^i_7\}$, whether the value is {1, 1} or {0, 0}.

In addition, the base station informs the approval about the AP and CD transmitted from the terminal through the AICH.

When it is x=1, because the base station only has to inform the approval of the signature transmitted from the terminal, the conventional AICH method is adapted as it is.

Herein, $\{a_0, a_1, a_2, \ldots, a_{31}\}$ can be described as below Equation 30.

$$a_j = \sum_{s=0}^{15} AI_s b_{s,j} \tag{30}$$

Herein, $AI_s$ means the AI about the used signature AP#s, it has a value among {+1, −1, 0}.

In addition, $b_{sj}$ is same with a table (signature pattern table of the general AICH) of FIG. 19.

When it is x>1, the base station has to inform not only the approval of the signature transmitted by the terminal, but also the approval of the PRACH preamble scrambling code.

For that, the AICH structure depicted in FIG. 27 is used. $\{a_0, a_1, \ldots, a_{15}\}$ is the AI part describing the approval of the used signature AP#s, and $\{b_0, b_1, \ldots, b_{15}\}$ is the RI part describing the approval of the used PCPCH preamble scrambling code. In other words, when $\{b_0, b_1, \ldots, b_{15}\}$ is the transmission bit on the CD-AICH, it describes the approval of the PCPCH CD access preamble scrambling code CD-APSC#m. Herein, $\{a_0, a_1, \ldots, a_{15}\}$ depicting the AI part can be described as below Equation 31.

$$a_j = \sum_{s=0}^{15} AI_s c_{s,j} \tag{31}$$

Figures 39, 40:
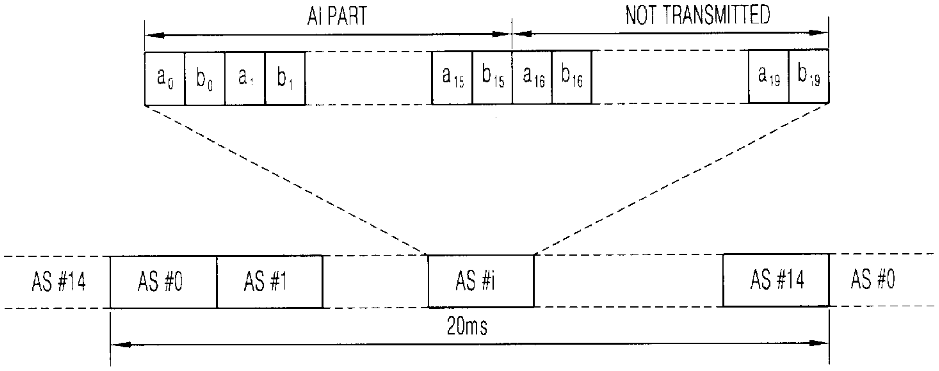
FIG. 39 illustrates a structure of the AICH in accordance with the present invention.
FIG. 40 is a table showing a signature pattern for the AI portion of the AICH in accordance with the present invention.

Herein, AIs describes the AI about the used signature AP#s, and it has a value among {+1, −1, 0}. Herein, $c_{sj}$ can be defined as a table of FIG. 40.

In addition, $\{b_0, b_1, \ldots, b_{15}\}$ depicting the RI part can be described as below Equation 32.

$$a_j = \sum_{s=0}^{15} RI_m c_{m,j} \tag{32}$$

Herein, $RI_m$ means the approval about the used PCPCH preamble scrambling code (namely, APSC#m, CD-APSC#m), it has a value among {+1, −1, 0}.

Herein, $c_{mj}$ can be defined as a table of FIG. 41.

In FIG. 41, m=4~15 are coefficients which can be used different ways.

When the AICH is actually transmitted, $\{a_0, a_1, \ldots, a_{15}\}$ bits describing the AI part are transmitted to one channel between the I/O channels, and $\{b_0, b_1, \ldots, b_{15}\}$ bits describing the RI part are transmitted to the other channel between the I/O channels.

Herein, the power ratio about the I/O channels can be adjusted. In other words, when the RI part only uses m=0~3, the channel transmitting the AI part including more data can use relatively bigger power than the channel transmitting the RI part including less data.

Meanwhile, the channel allocation method adaptable to one between the AP and CD can be embodied.

As described above, when the RACH among the up link channels used for transmitting the data from the terminal to the base station in the 3GPP system has extra scrambling codes, the physical channel allocation method of the mobile communication system in accordance with the present invention is capable of using resources of the RACH sufficiently by performing the efficient channel allocation In addition, when the RACH among the up link channels used for transmitting the data from the terminal to the base station in the 3GPP system has extra scrambling codes, the physical channel allocation method of the mobile communication system in accordance with the present invention is capable of using the AICH economically by providing the AICH structure adaptable for the allocation of 16 signatures, and several PRACH preamble scrambling codes per one cell.

In addition, the physical channel allocation method of the mobile communication system in accordance with the present invention is capable of performing the efficient physical channel allocation when there is a need to consider the reuse factor of the up link shared channel of the mobile communication system, accordingly the resources usability of the pertinent shared channel can be improved.

When the CPCH among the up link channels used for transmitting the data from the terminal to the base station has extra up link scrambling codes, the physical channel allocation method of the mobile communication system in accordance with the present invention is capable of improving the resources usability of the CPCH by performing the efficient physical channel allocation.

When the CPCH among the up link channels used for transmitting the data from the terminal to the base station has extra up link scrambling codes, the physical channel allocation method of the mobile communication system in accordance with the present invention is capable of using the AICH efficiently and economically.

The physical channel allocation method of the mobile communication system in accordance with the present invention is capable of performing the efficient physical channel allocation when there is a need to consider the reuse factor of the up link shared channel of the mobile communication system, accordingly the resources usability of the pertinent shared channel can be improved.

The physical channel allocation method of the mobile communication system in accordance with the present invention is capable of embodying an efficient and economic channel when a sub-channel is required in order to perform efficient physical channel allocation considering the reuse factor for the CPCH among the up link channels used for transmitting data from the terminal to the base station.

The physical channel allocation method of the mobile communication system in accordance with the present invention is capable of performing the efficient physical channel allocation when there is a need to consider the reuse factor of the up link shared channel of the mobile communication system, accordingly the resources usability of the pertinent shared channel can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A communication method of a mobile communication system comprising:

a step in which a terminal carries a preamble signature code (Csig,s) generated by using one of a plurality of signatures (AP#s) and a physical channel (PRACH) access preamble code (Cpre,n,s) of a first up-link generated by using one (SC#i) of 'x' number of physical channel (PRACH) preamble scrambling codes (SC#m) of the first up-link allowed to a corresponding cell, on an access preamble (AP), and transmits them to a base station through a channel (RACH) of the first up-link;

a step in which the terminal receives an AI from the base station which decodes the signature included in the received AP and the type of the physical channel (PRACH) scrambling code of the first up-link and generates an AI informing whether the signature is available for use, through a channel (AICH#m) of a first down-link; and a step in which the terminal transmits its message to the base station by using a channelization code that is determined by an acquired signature and the physical channel (PRACH) message part scrambling code (MSC#m) of the first up-link.

2. The communication method of the mobile communication system according to claim 1, wherein the channel of the first up link is a RACH#m, the physical channel of the first up link is a PRAC#mH, and the first down link channel is an AICH#m and/or a RRICH#m.

3. A communication method of a mobile communication system comprising:

a step in which a terminal carries a preamble signature code (Csig,s) generated by using one of a plurality of signatures (AP#s) and a PRACH access preamble code (Cpre,n,s) generated by using one (SC#i) of 'x' number of PRACH preamble scrambling codes (SC#m) allowed to a corresponding cell, on an access preamble (AP), and transmits them to a base station through RACH;

a step in which the terminal receives an AI from the base station which decodes the signature included in the received AP and the type of the PRACH scrambling code and generates the AI informing whether the signature is available for use through a AICH#m; and a step in which the terminal transmits its message to the base station by using a channelization code that is determined by an acquired signature and the PRACH message part scrambling code (MSC#m).

4. The communication method of the mobile communication system according to claim 3, wherein the number of signatures is 16.

5. The communication method of the mobile communication system according to claim 3, wherein the x-number can be optionally determined.

6. The communication method of the mobile communication system according to claim 3, wherein the x-number is a reuse factor of the pertinent cell, it is not smaller than 2 and not greater than 16.

7. The communication method of the mobile communication system according to claim 3, wherein the plurality of signatures AP#s and the "x" number of PRACH preamble scrambling codes SC#m are determined by an ASC (Access Service Class) given to the superior layer of a protocol of the terminal and base station.

8. The communication method of the mobile communication system according to claim 7, wherein the superior layer has information about usable signatures, a RACH code channel group, and a RACH sub-channel group about each RACH code channel in the RACH code channel group defined in accordance with the each ASO.

9. The communication method of the mobile communication system according to claim 8, wherein the RACH code channel group is constructed with a certain number of RACH code channels among the x-number of RACH code channels.

10. The communication method of the mobile communication system according to claim 8, wherein the RACH sub-channel group is a set constructed with a certain number of RACH sub-channels among the 12 RACH sub-channels.

11. The communication method of the mobile communication system according to claim 3, wherein the RACH defines the sub-channels of itself and slots corresponding to the sub-channels respectively, and the definitions can be same or different in accordance with the RACH code channel.

12. The communication method of the mobile communication system according to claim 3, wherein the RACH code channels correspond one-to-one to the PRACH preamble scrambling code.

13. The communication method of the mobile communication system according to claim 3, wherein the AICH#m uses the same down link scrambling code and different OVSF code.

14. The communication method of the mobile communication system according to claim 3, wherein the PRACH message part scrambling code MSC#m is in one-to-one correspondence relation with the PRACH preamble scrambling code.

15. The communication method of the mobile communication system according to claim 3, wherein the AICH#m structure comprises access slots repeated by a x-number unit.

16. The communication method of the mobile communication system according to claim 15, wherein the one access slot is constructed with an AI part and a non-transmission part.

17. The communication method of the mobile communication system according to claim 16, wherein bits $a_j^m$ included in the AI part is determined by $$a_j^m = \sum_{s=0}^{x} AI_s^m b_{s,j},$$

herein, $AI_s^m$ is an AI (Acquisition Indicator) about the signature AP#s transmitted along with the AP by the terminal, it has a value among {+1, −1, 0}, and $b_{sj}$ is a number describing the signature pattern.

18. The communication method of the mobile communication system according to claim 3, wherein the AICH#m further comprises a RRICH#m (Reuse RACH Indicator Channel) considering the reuse factor of the RACH.

19. The communication method of the mobile communication system according to claim 18, wherein the RRICH#m uses transmission interruption time in the one access slot on the AICH#m used for the RACH#m.

20. The communication method of the mobile communication system according to claim 18, wherein the information transmission unit of the RRICH#m is same with the information transmission unit of the AICH#m.

21. The communication method of the mobile communication system according to claim 18, wherein the approval of the signature is judged by the AICH#m, and the approval of the PRACH#m preamble scrambling code is judged by the RRICH#m.

22. The communication method of the mobile communication system according to claim 18, wherein the RRICH#m and AICH#m can determine optionally the down link scrambling code and channel section code of themselves.

23. The communication method of the mobile communication system according to claim 18, wherein the RRICH#m can be transmitted from the base station to the terminal by one frame unit or each access slot unit.

24. The communication method of the mobile communication system according to claim 18, wherein the RRICH#m structure comprises access slots repeated by a x-number unit.

25. The communication method of the mobile communication system according to claim 24, wherein the one access slot is constructed with a non-transmission bit part and a RI (Reuse Indicator) part describing a reuse.

26. The communication method of the mobile communication system according to claim 24, wherein bits included in the RI part can be mapped variously when the RRICH#m is used for informing the approval of the PRACH preamble scrambling code.

27. The communication method of the mobile communication system according to claim 24, wherein bits $b^{ki}$ of the RI part are determined by $$b_k^i = \sum_{m=0}^{x} RI_m c_k,$$

herein, $RI_m$ describes the approval about the PRACH preamble scrambling code SC#m and it has a value among {+1, −1, 0}.

28. The communication method of the mobile communication system according to claim 18, wherein the AICH#m structure considering the reuse factor is constructed with an AI part informing the approval of the used signature, a RI part informing the approval of the used PRACH preamble scrambling code, and a non-transmission part.

29. The communication method of the mobile communication system according to claim 28, wherein bits $a_j$ included in the AI part are determined by $$a_j = \sum_{s=0}^{15} AI_s c_{s,j},$$

herein, the AIs describes the AI about the used signature AP#s, it has a value among +1, −1, 0, and $c_{s,j}$ describes a coefficient.

30. The communication method of the mobile communication system according to claim 28, wherein bits $b_j$ included in the RI part are determined by $$b_j = \sum_{m=0}^{15} RI_m c_{m,j},$$

herein, the $RI_m$ describes the approval about the used PRACH preamble scrambling code SC#m, it has a value among {+1, −1, 0}, and the $C_{m,j}$ describes a coefficient.

31. The communication method of the mobile communication system according to claim 18, wherein the RRICH#m can be transmitted from the base station to the terminal by one frame unit or each access slot unit.

32. The communication method of the mobile communication system according to claim 1, wherein the first up link is a CPCH, the first up link physical channel is a PCPCH, the first down link is an AP-AICH#m, and the second down link is a CD-AICH#m.

33. A communication method of a mobile communication system comprising:

a step in which a terminal carries a preamble signature code (Csig,s) generated by using one of a plurality of signatures (AP#s) and a PCPCH access preamble code (Cpre,n,s) generated by using one (APSC#i) of 'x' number of PCPCH preamble scrambling codes (APSC#m) allowed to a corresponding cell, on an access preamble (AP), and transmits them to a base station through a CPCH;

a step in which the terminal receives the AI from the base station which decodes the signature included in the received AP and the type of the PCPCH scrambling code and generates the AI informing whether the signature is available for use, through an AP-AICH#m;

a step in which the terminal transmits its message to the base station by using a channelization code that is determined by the acquired signature and the physical channel (PRACH) message part scrambling code (MSC#m);

a step in which the terminal carries a preamble signature code (Ca-acc,s) generated by using one of a plurality of signatures (AP#s) and a PCPCH-CD access preamble code (Cc-cd,n,s) generated by using one (CDSC#i) of 'y' number PCPCH-CD preamble scrambling codes (CDSC#m) allowed to a corresponding cell, on an collision detecting preamble (CD), and transmits them to a base station through the CPCH;

a step in which the terminal receives an AI from a base station which generates the AI informing on the collision for the CD for detecting a collision through CD-AICH#m; and a step in which the terminal transmits its message to the base station by using the channelization code determined by the acquired signature and the PRACH message part scrambling code (MSC#m).

34. The communication method of the mobile communication system according to claim 33, wherein the PCPCH access preamble scrambling code is in an one-to-one correspondence relation with the AP-AICH#m, and the PCPCH CD access preamble scrambling code is in an one-to-one correspondence relation with the CD-AICH#m.

35. The communication method of the mobile communication system according to claim 33, wherein the AP-AICH#m and CD-AICH#m use the same down link scrambling code.

36. The communication method of the mobile communication system according to claim 33, wherein the AP-AICH#m uses the different channelizing code each other, and CD-AICH#m uses the different channelizing code each other.

37. The communication method of the mobile communication system according to claim 36, wherein a certain channelizing code of the AP-AICH#m and a certain channelizing code of the CD-AICH#m can be same.

38. The communication method of the mobile communication system according to claim 36, wherein when the x is 64, the number of CPCH code channels is 4, the each CPCH code channel has the 16 PCPCH scrambling codes.

39. The communication method of the mobile communication system according to claim 33, wherein the AP-AICH#m or CD-AICH#m structure comprises access slots repeated by a x-number unit.

40. The communication method of the mobile communication system according to claim 39, wherein the access slot is constructed with an AI part and a non-transmission part.

41. The communication method of the mobile communication system according to claim 33, wherein the AP-AICH#m further comprises an AP-CRICH#m, and the CD-AICH#m further comprises a CD-CRICH#m.

42. The communication method of the mobile communication system according to claim 41, wherein the AP-CRICH#m and/or CD-CRICH#m uses transmission interruption time in the one access slot of the AP-AICH#m and/or CD-AICH#m used for the CPCH#m.

43. The communication method of the mobile communication system according to claim 42, wherein the AP-CRICH#m and CD-CRICH#m structure comprise access slots repeated by a x-number unit.

44. The communication method of the mobile communication system according to claim 42, wherein the one access slot is constructed with a non-transmission part and a RI (Reuse Indicator) part describing a reuse.

45. The communication method of the mobile communication system according to claim 42, wherein bits included in the RI part can be mapped variously when the AP-CRICH#m and CD-CRICH#m are used for informing the approval of the PCPCH preamble scrambling code and PCPCH CD preamble scrambling code.

46. The communication method of the mobile communication system according to claim 41, wherein the structures of the AP-CRICH#m and CD-CRICH#m considering the reuse factor are constructed with an AI part informing the approval of the used signature, a RI part informing the approval of the used PRACH preamble scrambling code, and a non-transmission part.

47. A physical channel allocation method of a mobile communication system, wherein a terminal transmits an access preamble by using a signature among 16 signatures and a PRACH preamble scrambling code among PRACH preamble scrambling codes allotted to the pertinent cell in order to be allocated a PRACH when a plurality of PRACH preamble codes are allotted to the pertinent cell in consideration of a reuse of the PRACH and wherein the terminal transmits a message using a PRACH message part scrambling code having a one-to-one correspondence with a PRACH preamble scrambling code used as an access preamble when the transmitted access preamble is approved by a base station.

48. The physical channel allocation method of the mobile communication system according to claim 47, wherein the PRACH preamble scrambling code used as the access preamble and the PRACH message part scrambling code use the different parts of the same code.

49. A physical channel allocation method of a mobile communication system, comprising:

transmitting an AP (Access Preamble) by using a signature among 16 signatures AP#s (s=0, . . . , 15) and a PRACH preamble scrambling code SC#m among PRACH preamble scrambling codes allotted to the pertinent cell for allocating a PRACH in order to transmit data from a terminal to a base station when reuse of the PRACH is considered; and transmitting a message by using a PRACH message part scrambling code having one-to-one correspondence with the PRACH preamble scrambling code SC#m used in the AP (Access Preamble) when the AP is approved by the base station, wherein the base station amends the conventional AICH structure and informs through the amended AICH whether the access preamble transmitted from the terminal is approved.

50. The physical channel allocation method of the mobile communication system according to claim 49, wherein the signature and PRACH preamble scrambling code usable in the access preamble for the RACH transmission by the terminal are determined by an ASC (Access Service Class) given by the superior layer for the RACH transmission.

51. The physical channel allocation method of the mobile communication system according to claim 49, wherein information about the approval of the access preamble transmitted from the terminal and the present RACH are informed through the conventional AICH or a certain physical channel RRICH.

52. The physical channel allocation method of the mobile communication system according to claim 49, wherein when the number meaning the reuse factor of the pertinent cell is not smaller than 2, the information about the reuse of the signature is informed together when the approval about the access preamble transmitted from the terminal is determined and is informed.

53. The physical channel allocation method of the mobile communication system according to claim 52, wherein the approval about the access preamble is informed through the AICH constructed with an AI part informing the approval of the used signature AP#s, and a RI part informing the approval of the used PRACH preamble scrambling code SC#m.

54. A physical channel allocation method of a mobile communication system, wherein an x-number of PCPCH scrambling codes are classified with a y-number of CPCH code channels when 16 signatures AP#s (s=0, . . . , 15) and an x-number of PCPCH scrambling codes per one cell are allotted in the mobile communication system by considering a reuse of PCPCH, the PCPCH scrambling code included in each CPCH code channel is used for the PCPCH message part scrambling code, and two among the PCPCH scrambling codes are selected in order to use them for the PCPCH access preamble scrambling code and PCPCH CD access preamble scrambling code and wherein the terminal transmits a message using a PCPCH message part scrambling code MSC#n when the transmitted AP and CD are approved by the base station, and the MSC#n is determined by the APSC#m and AP#s used in the AP.

55. The physical channel allocation method of the mobile communication system according to claim 54, wherein the terminal transmits the access preamble by using one signature among the 16 signatures and one PCPCH access preamble scrambling code among the PCPCH access preamble scrambling codes allotted to the pertinent cell in order to be allotted the PCPCH when the 16 signatures and x-number of PCPCH scrambling codes per one cell are allocated in consideration of the reuse of the PCPCH.

56. The physical channel allocation method of the mobile communication system according to claim 54, wherein the terminal transmits the access preamble by using one signature among the 16 signatures and one PCPCH CD access preamble scrambling code among the PCPCH CD access preamble scrambling codes allotted to the pertinent cell in order to be allocated the PCPCH when the 16 signatures and x-number of PCPCH scrambling codes per one cell are allotted in consideration of the reuse of the PCPCH.

57. A physical channel allocation method of a mobile communication system, wherein a base station informs through four AP-AICH and four CD-AICH whether an AP and a CD transmitted from a terminal are approved when four CPCH code channels (code-channel#0~code-channel#3 exist, and wherein the approval about an AP using an APSC#m is determined by an AP-AICH#m, and the approval about a CD using a CD-APS#m is determined by a CD-AICH#m.

58. A physical channel allocation method of a mobile communication system, wherein an x-number of PCPCH scrambling codes are classified with a y-number of code groups when 16 signatures AP#s (s=0, . . . , 15) and an x-number of PCPCH scrambling codes per one cell are allotted in the mobile communication system by considering a reuse of PCPCH, the PCPCH scrambling code included in each CPCH code channel is used for the PCPCH message part scrambling code, and two among the PCPCH scrambling codes are selected in order to use them as the PCPCH access preamble scrambling code and PCPCH CD access preamble scrambling code and wherein the terminal transmits an access preamble by using one signature among the 16 signatures and one PCPCH access preamble scrambling code among the PRACH access preamble scrambling codes allotted to the pertinent cell in order to be allocated the PCPCH.

59. The physical channel allocation method of the mobile communication system according to claim 58, wherein the terminal transmits a collision detection CD by using one signature among the 16 signatures and one PCPCH access preamble scrambling code among the PRACH access preamble scrambling codes allotted to the pertinent cell in order to be allocated the PCPCH when the reuse of the PCPCH is considered.

60. A communication method in a mobile communication system in which a plurality of terminals transmit an access preamble to a base station, comprising:

transmitting an access preamble from each of the plurality of terminals to the base station using one of a plurality of signatures and one of a plurality of preamble scrambling codes for each access preamble;

receiving an access preamble including the signature and the preamble scrambling code from each of the plurality of terminals at the base station;

transmitting an acquisition indication from the base station to each of the plurality of terminals through one of a plurality of Acquisition Indicator Channels, wherein the acquisition indication indicates whether the signature and preamble scrambling code are usable and each Acquisition Indicator Channel uses different Orthogonal Variable Spreading Factor codes as a channelization code; and receiving a message at each of the plurality of terminals, the message received at each terminal generated by a channelization code that is determined by the acquired signature and message part scrambling code corresponding to the preamble scrambling code received by the base station from the terminal, wherein the preamble scrambling code, Acquisition Indicator Channel, Orthogonal Variable Spreading Factor Code and message part scrambling codes are uniquely assigned to each of the plurality of terminals and are in a 1:1:1:1 ratio.

61. The method of claim 60, wherein the preamble scrambling code is a code for a physical random access channel or a physical common packet channel.

62. The method of claim 60, wherein the Acquisition Indicator Channel is an access preamble Acquisition Indicator Channel or a collision detection Acquisition Indicator Channel.

63. The method of claim 60, wherein the Acquisition Indicator Channel uses the same down link scrambling code.

64. The method of claim 60, wherein the number of the Acquisition Indicator Channel is determined by the number of the preamble scrambling code allocated to the corresponding cell.

65. The method of claim 60, wherein the Acquisition Indicator Channel includes a first part for acquisition of the signature and a second part for acquisition of the preamble scrambling code.

66. The method of claim 65, wherein the second part is a non-transmission part of the Acquisition Indicator Channel.

67. A communication method in a mobile communication system that is allocated 16 signatures and a plurality of preamble scrambling codes per cell for channel transmission, comprising:

transmitting an access preamble by selecting one of 16 signatures and one of the preamble scrambling codes to the base station;

receiving an acquisition indication from the base station through a separate physical channel and an acquisition indicator channel, wherein the separate physical channel indicates whether the preamble scrambling code is acquired by the base station and the acquisition indicator channel indicates whether the signature is acquired by the base station and transmitting a message to the base station by using a channelization code that is determined by the acquired signature and message part scrambling code that corresponds to the acquired preamble scrambling code.

68. The method of claim 67, wherein the separate physical channel uses a non-transmission part of the Acquisition Indicator Channel.

69. The method of claim 67, wherein the Acquisition Indicator Channel indicates only whether the signature is acquired by the base station.

70. The method of claim 67, wherein the separate physical channel contains a message that indicates a specific preamble scrambling code.

71. The method of claim 67, wherein an information transmission unit of the separate physical channel is the same as the information unit of the Acquisition Indicator Channel.

72. The method of claim 67, wherein the separate physical channel is a Reuse Random Access Channel Indicator channel on a Common Packet Channel Reuse Indicator channel.

* * * * *